US012775787B2

(12) United States Patent
Child et al.

(10) Patent No.: US 12,775,787 B2
(45) Date of Patent: Oct. 27, 2026

(54) XM INPUT PROCESSING SYSTEM FOR DEFINING PROMPTS FOR A LARGE LANGUAGE MODEL AND RECEIVING MODEL OUTPUTS

(71) Applicant: Qualtrics, LLC, Provo, UT (US)

(72) Inventors: Evan Paul Child, Provo, UT (US); Wael Jendli, Sammamish, WA (US); Joseph Scott Reese, Heber City, UT (US)

(73) Assignee: Qualtrics, LLC, Provo, UT (US)

( * ) Notice: Subject to any disclaimer, the term of this patent is extended or adjusted under 35 U.S.C. 154(b) by 212 days.

(21) Appl. No.: 18/473,920

(22) Filed: Sep. 25, 2023

(65) Prior Publication Data

US 2025/0103801 A1 Mar. 27, 2025

(51) Int. Cl.
*G06F 40/20* (2020.01)

(52) U.S. Cl.
CPC .................................... *G06F 40/20* (2020.01)

(58) Field of Classification Search
CPC ................................. G06F 40/20; G06F 40/30
See application file for complete search history.

(56) References Cited

U.S. PATENT DOCUMENTS

| | | | | |
|---|---|---|---|---|
| 2007/0168241 A1* | 7/2007 | Robbins | G06Q 10/10 | 705/7.42 |
| 2011/0276447 A1* | 11/2011 | Paul | H04L 65/1069 | 709/227 |
| 2012/0226743 A1* | 9/2012 | Smargon | G06Q 20/384 | 709/203 |
| 2015/0051976 A1* | 2/2015 | Brown | G06Q 30/0267 | 705/14.58 |
| 2018/0268313 A1* | 9/2018 | Baxter | G06Q 10/0635 | |
| 2020/0279017 A1* | 9/2020 | Norton | G06N 3/045 | |
| 2020/0342470 A1* | 10/2020 | Morningstar | G06Q 30/0203 | |
| 2023/0410022 A1* | 12/2023 | Childress | G06N 20/00 | |
| 2024/0330589 A1* | 10/2024 | Kotaru | G06F 40/205 | |
| 2024/0377932 A1* | 11/2024 | Zhao | G06F 40/30 | |
| 2024/0403904 A1* | 12/2024 | Levitan | G06Q 30/0203 | |
| 2024/0420189 A1* | 12/2024 | Vajjiparti | G06F 9/451 | |

OTHER PUBLICATIONS

Jansen, B. J., Jung, S. G., & Salminen, J. (2023). Employing large language models in survey research. Natural Language Processing Journal, 4, 100020. (Year: 2023).*

* cited by examiner

*Primary Examiner* — Philip H Lam
(74) *Attorney, Agent, or Firm* — Keller Preece PLLC

(57) ABSTRACT

This disclosure covers systems and methods that define a prompt for a large language model that references dynamic experience data content and based on a model output, determines at least one action to perform. In certain embodiments, by defining a prompt for a large language model and receiving an experience data instance from a respondent device, the disclosed system sends the experience data instance with the defined prompt to the large language model. Further, the disclosed system receives a model output from the large language model, where the first model output is generated based on the large language model analyzing the experience data instance according to the prompt.

20 Claims, 14 Drawing Sheets

700

702

{
    “First Name”: “Conor”,
    “Qualtrics Teams”: [
        “Product & Engineering”,
        “User Experience”
    ],
    “Sentiment”: “Neutral”,
    “Intensity”: “Low”,
    “Urgency for someone to respond”: “Low”,
    “Themes”: [
        “Survey Display and Functionality”,
        “Survey Logic and Skip Logic”,
        “Survey Import and Management”,
        “Survey Flow”
],
    “Category”: “Product Improvement Suggestion”,
    “PXE Response Summary”: “Conor suggests improvements to the survey platform regarding display, logic, import, and management. They suggest adding an ‘unfold all’ option, setting display logic for ranges or criteria, and carrying over page breaks when importing questions. They also note difficulties in making piped text lower case and managing end of survey messages.”
}

*Fig. 8B*

Dear Conor,

Your feedback plays a critical role in how we design, deploy, and improve our products. We are committed to making continuous improvements to deliver better experiences for our customers.

We wanted to let you know that your feedback has been reviewed by the following Qualtrics Teams:

Product & Engineering
User Experience

After categorizing your feedback, we have identified the following themes:

Survey Display and Functionality
Survey Logic and Skip Logic
Survey Import and Management
Survey Flow Thanks you for your suggestions regarding improvements to the survey platform. We particularly appreciate your input on adding an 'unfold all' option, setting display logic for ranges or criteria, and carrying over page breaks when importing questions, We will make sure to review these suggestions with out development team.

We appreciate your feedback and will use it to inform our product roadmap. If you have any further feedback, please don't hesitate to reach out.

Best Regards,

Product Experience Management Team

*Fig. 8C*

XM INPUT PROCESSING SYSTEM FOR DEFINING PROMPTS FOR A LARGE LANGUAGE MODEL AND RECEIVING MODEL OUTPUTS

BACKGROUND

Digital content providers increasingly distribute digital surveys and collect digital data from network users and other audiences. As digital content proliferates and the need for collecting information regarding network users and other audiences increases, digital content providers send and collect an increased amount of data. This increase in collecting and receiving digital data complicates the administration of implementing feedback from digital surveys and responding to additional information collected from network users and other audiences.

Collecting and receiving digital information (e.g., digital surveys and additional information such as digital journeys) generally requires digital content providers to undergo a complicated and tedious process. For instance, digital content providers are generally required to configure a step-by-step response to various events identified from data received within their platform. In particular, digital content providers can configure for specific information coming in, a specific response (e.g., if X response is received then perform Y). However, despite the ability of digital content providers to design workflows to have specific responses to specific situations, digital content providers face a variety of technological problems in the realm of collecting and receiving digital information.

For example, in configuring how to collect and receive digital information, digital content providers are typically required to undergo a tedious and computationally demanding process. Specifically, digital content providers are typically required to customize responses and actions to take for each type of survey or digital journey information or data. In doing so, digital content providers consume a high number of computational resources to tailor appropriate responses and actions to collecting certain types of data (e.g., survey responses or digital journey data) and further face challenges with differentiating between different types of data and determining which system or entity should handle the different types of data.

Due to the sheer volume of digital survey data and additional digital information collected, digital content providers also struggle with efficiently analyzing incoming data. When digital content providers capture data, the large amount of information consumes significant resources to process data to identify the type, topic, and sentiment, for example, of feedback within the data. Furthermore, due to the significant number of resources required to process the journey data, digital content providers struggle with efficiently assigning action steps associated with the feedback to the correct segment of an entity or organization.

Moreover, some digital content providers, even after expending a large number of computational resources to process the journey or feedback data, incorrectly assign action steps associated with the feedback. For instance, due to survey responses and additional information containing vague or indirect information, conventional systems struggle to accurately process the journey data. In many instances, conventional systems are unable to accurately gage the sentiment and context surrounding feedback data and as such, inaccurately identify actions to take and/or inaccurately route the actions to be taken to the wrong segment of an entity or organization.

Furthermore, digital content providers typically provide a response to a user of a respondent device in response to receiving a survey response or additional information from a respondent of a respondent device. Digital content providers do so to confirm for the user that their survey response or additional information was received. However, digital content providers struggle with operational flexibility. For instance, digital content providers struggle to generate tailored and accurate responses in a computationally timely manner in response to data received from a respondent. In particular, due to digital content providers suffering from the above-mentioned efficiency and accuracy issues, operational flexibility issues are further exacerbated.

Accordingly, these and other disadvantages decrease the utility of conventional digital survey systems and display mediums.

SUMMARY

This disclosure describes solutions to some or all the foregoing problems with systems and methods that collect survey responses and additional information from network users and other audiences. For instance, the systems and methods implement intelligent action loops that incorporate machine learning for routing feedback to segment(s) of an entity and responding to a user's survey response or additional information in the moment. For example, the systems and methods define a prompt for a large language model that references dynamic experience data content. Further, the systems and methods receive an instance of the experience data from a respondent of a respondent device and sends the experience data instance along with the defined prompt to the large language model. Moreover, the systems and methods receive a model output from the large language model where the model output was generated based on the large language model analyzing the experience data instance according to the prompt. In doing so, the disclosed systems and methods further determines additional downstream actions to perform with respect to the experience data instance based on the model output.

The following description sets forth additional features and advantages of one or more embodiments of the disclosed systems and methods. In some cases, such features and advantages will be obvious to a skilled artisan from the description or may be learned by the practice of the disclosed embodiments.

BRIEF DESCRIPTION OF THE DRAWINGS

The detailed description refers to the drawings briefly described below.

FIG. 8B illustrates a specific example of a model output in accordance with one or more embodiments.

FIG. 8C illustrates an additional specific example of a model output in accordance with one or more embodiments.

DETAILED DESCRIPTION

Figure 1:
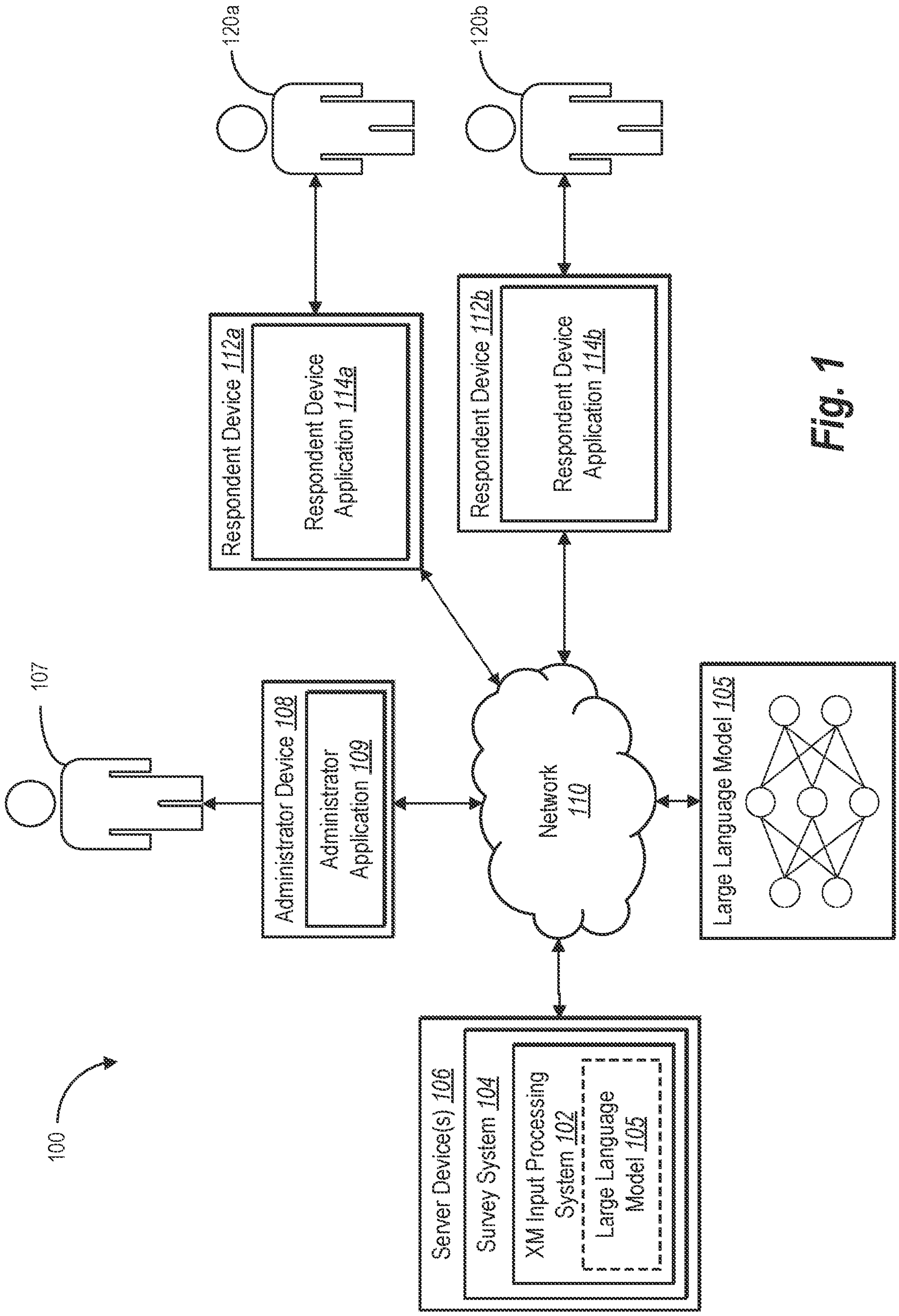
FIG. 1 illustrates a block diagram of an environment for implementing a XM input processing system in accordance with one or more embodiments.

This disclosure describes one or more embodiments of a XM input processing system that defines a prompt for a large language model and receives a model output from the large language model analyzed according to the defined prompt. By defining the prompt for the large language model that references dynamic experience data content, in one or more embodiments, the XM input processing system efficiently and accurately analyzes experience data instances according to the defined prompt. For instance, the XM input processing system generates a model output by parsing an experience data instance according to the prompt and determines an action to perform. Specifically, in some embodiments the action to perform can include sending the model output to a determined administrator client device.

For instance, in some embodiments, the XM input processing system defines additional prompts to provide to the large language model. In some such instances, the XM input processing system defines an additional prompt that references the model output. Moreover, based on the model output and the additional defined prompt, the XM input processing system receives an additional output (e.g., a tailored email or message) from the large language model. Specifically, in some embodiments, the XM input processing system can send the additional output to a respondent device that sent the experience data instance (e.g., a survey response).

Additionally, in some embodiments, the XM input processing system defines additional prompts for additional actions to occur. For instance, in some embodiments, the XM input processing system defines an additional prompt that references the model output to further receive an additional model output from the large language model. In some embodiments, the additional model output includes a list of recommendations for an administrator, a digital gift card, a coupon, or a suggested response (e.g., reviewed by an administrator prior to sending to a respondent of a respondent device).

The XM input processing system further defines prompts to analyze data according to various factors and categories. For instance, in some embodiments, the XM input processing system defines a prompt to determine responsive engagement factors and experience data content categories. In particular, in some embodiments, the responsive engagement factors include sentiment, intensity, and urgency level. Further, in some embodiments, the XM input processing system in defining the prompt indicates to the large language model to identify specific content categories such as request, suggestion, or bug. Moreover, in some embodiments, the XM input processing system also indicates a task to the large language model that includes summarizing or translating, the experience data instance.

In one or more embodiments, the XM input processing system identifies contextual data (e.g., contextual information). For instance, in some embodiments, the XM input processing system defines a prompt to reference dynamic experience data content plus content apart from the experience data content. Specifically, the XM input processing system can define a prompt to reference previously received experience data content associated with a specific user. In doing so, the XM input processing system adds context for the large language model to generate a more accurate model output. In particular, the XM input processing system receives the model output from the large language model generated based on contextual data, the defined prompt, and the experience data instance.

In some embodiments, the XM input processing system implements a unique combination of components to address technological issues of conventional digital content provider systems. Specifically, in some embodiments, the XM input processing system by defining a prompt for a large language model that references dynamic experience data content and sending the experience data instance along with the prompt, overcomes technological problems faced by conventional digital content providers. For instance, in some embodiments, the XM input processing system automates many of the previous tedious and manual tasks to overcome technological problems (e.g., accuracy, efficiency, and operational flexibility problems) such as accounting for variations in data received, understanding the data, and performing downstream tasks in response to the received data.

For instance, as discussed above, conventional digital content providers face issues of complicated and tedious processes of configuring a step-by-step response for each data type. Unlike conventional digital content providers, in some embodiments the XM input processing system allows for an efficient and non-complicated process of defining a prompt. Specifically, in some embodiments, defining a prompt delegates the tedious and complicated process of accounting for and understanding various data types to a large language model. Further, in some embodiments, the XM input processing system implements the defined prompt that dynamically references experience data content to receive various outputs from the large language model. Further, in some embodiments, based on the various outputs, the XM input processing system also performs various downstream actions. As mentioned previously, the downstream actions include the XM input processing system routing model output to a relevant segment of an entity or organization or providing additional defined prompts to the large language model (e.g., to receive recommendations based on the model output).

Further, similar to above, in some embodiments the XM input processing system overcomes computational inefficiencies of tedious personalization for each type of data by identifying different types of feedback within data and assigning corresponding action steps. In particular, in some embodiments the XM input processing system does so by sending the experience data instance with the defined prompt to the large language model. For instance, the XM input processing system receives the first output from the large language model which was generated based on analyzing the experience data instance according to the prompt. As such, in some embodiments, the XM input processing system receives the first output with the type of feedback identified by the large language model and based on the identified type of feedback determines a corresponding action step.

Further, in some embodiments, the XM input processing system also overcomes computational accuracy issues of identifying the content of feedback within data. For instance, in some embodiments, the XM input processing system by defining a prompt and providing the defined prompt along with the experience data instance to the large language model. In doing so, the XM input processing system overcomes accuracy issues by parsing data according to a defined prompt to understand vague or indirect information. Further, in some embodiments, the XM input processing system receives the model output from the large language model analyzed according to the prompt without having to rely upon manual and tedious processes of analyzing data. As such, the XM input processing system accurately determines specific segments of an entity to route the model output to and/or to perform accurate actions in response to the received data.

As discussed above, in some embodiments by improving upon efficiency and accuracy, the XM input processing system also improves upon operational flexibility. For instance, the XM input processing system defines a prompt according to various responsive engagement factors and experience data content categories to send to the large language model along with experience data instances. As such, in some embodiments, the XM input processing system flexibly operates with a wide range of data types in an efficient and accurate manner. Moreover, in some embodiments, the XM input processing system also flexibly executes actions in response to receiving model outputs from the large language model (e.g., the XM input processing system sends a tailored response to a respondent in in the moment).

Turning now to the figures, FIG. 1 provides an overview of an environment 100 in which a XM input processing system 102 within a survey system 104 can operate. After providing an overview of the environment 100, this disclosure describes embodiments of the XM input processing system 102 in more detail with reference to FIGS. 2-9.

As illustrated in FIG. 1, the environment 100 includes an administrator device 108 associated with an administrator application 109. The environment 100 further includes respondent devices 112*a* and 112*b* (collectively referred to as "respondent devices 112") that are respectively associated with survey respondents 120*a* and 120*b* (collectively referred to as "survey respondents 120"). Each of the respondent devices 112*a* and 112*b* likewise respectively comprise a respondent device application 114*a* and 114*b* (collectively referred to as the "respondent device applications 114"). The survey respondents 120 may interact with the respondent device applications 114 to respond to digital survey questions. In some embodiments, the respondent device applications 114 comprise web browsers, applets, dedicated applications (e.g., dedicated digital survey applications), instant message applications, SMS applications, email applications, and/or other software applications available to the respondent devices 112.

Although FIG. 1 illustrates one administrator device 108, and a few respondent devices 112, the environment 100 may include any number of administrator devices associated with any number of survey administrators, or any number of respondent devices associated with any number of survey respondents.

In general, the administrator device 108 and the respondent devices 112 communicate with server device(s) 106, including the XM input processing system 102 within the survey system 104, over a network 110. As described below, the server device(s) 106 enable various functions, features, processes, methods, and systems described herein using, for example, the XM input processing system 102. Additionally, or alternatively, the server device(s) 106 coordinate with the administrator device 108, and/or the respondent devices 112 to perform or provide the various functions, features, processes, methods, and systems described in more detail below. Although FIG. 1 illustrates a particular arrangement of the server device(s) 106, the administrator device 108, the respondent devices 112 and the network 110, additional arrangements are possible. For example, the server device(s) 106 and the XM input processing system 102 may directly communicate with the administrator device 108 and thus bypass the network 110.

Within the arrangement shown in FIG. 1, the administrator device 108 and the respondent devices 112 can include any one of various types of client devices. For example, the administrator device 108 and the respondent devices 112 can be mobile devices, tablets, laptop computers, desktop computers, smart televisions, televisions, monitors, or any other type of computing device, as further explained below with reference to FIG. 10.

Additionally, the server device(s) 106 can include one or more computing devices, including those explained below with reference to FIG. 10. The administrator device 108 and the respondent devices 112, server device(s) 106, and network 110 may communicate using any communication platforms and technologies suitable for transporting data and/or communication signals, including any known communication technologies, devices, media, and protocols supportive of data communications, examples of which are described with reference to FIG. 11.

As an overview of the environment 100, the server device(s) 106 provide the administrator device 108 access to the XM input processing system 102 through the network 110. In one or more embodiments, by accessing the survey system 104, the server device(s) 106 provide one or more digital documents (e.g., webpages) to the administrator device 108 to allow the administrator device 108 via the administrator application 109 to compose a digital survey. The digital documents include tools and options that facilitate composing a digital survey for distribution to the respondent devices 112. Further, in one or more embodiments, by accessing the XM input processing system 102, the server device(s) 106 further access a large language model 105. By accessing the XM input processing system 102 and components such as the large language model 105, the server device(s) 106 receive various model outputs to route to the administrator device 108 or to respondent devices 112.

Figure 2:
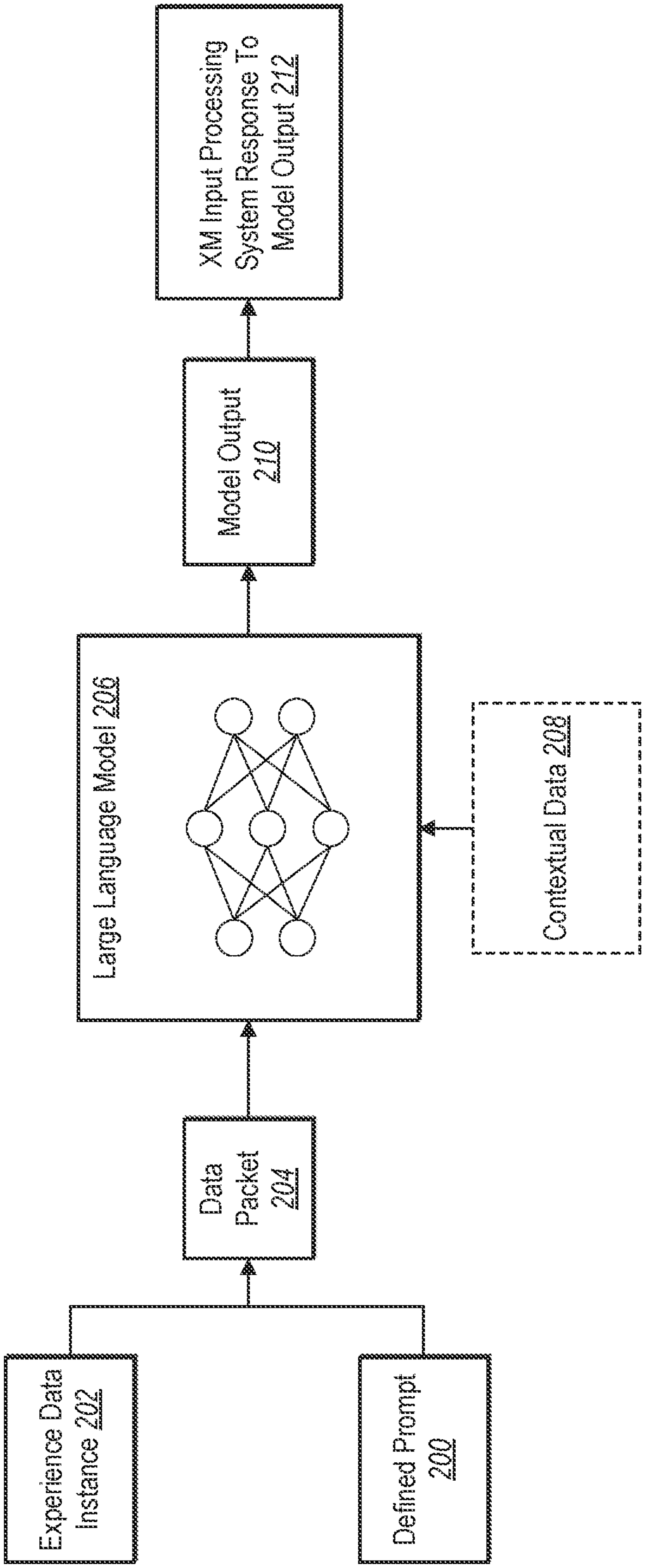
FIG. 2 illustrate an overview diagram of the XM input processing system receiving a model output from a large language model in accordance with one or more embodiments.

Moreover, as shown in FIG. 2, in some embodiments the large language model 105 is housed on the server device(s) 106 and is a part of the XM input processing system 102. Further, as also shown in FIG. 2, in some instances, the large language model 105 is not housed on the server device(s)

106 but exists separately from and interacts with the XM input processing system 102 via the network 110.

Referring back now to FIG. 1, in certain embodiments, the XM input processing system 102 provides tools to the administrator device 108 for a survey administrator 107 to compose one or more digital survey questions that comprise a textual query for distribution to the respondent devices 112. After the survey administrator 107 composes a digital survey, the survey system 104 causes the server device(s) 106 to send the digital survey to one or more of the respondent devices 112, such as the respondent device 112*a*. For example, the survey system 104 can provide a digital survey comprising multiple digital survey questions (each of which comprise a textual query or various different types of queries-multiple choice, heat map, true/false, etc.) to the respondent device 112*a*.

Upon receiving a digital survey, the respondent device 112*a*, for example, presents the textual queries of the digital survey to the survey respondent 120*a*. The survey respondent 120*a* may respond to textual queries within the digital survey by providing user input via the respondent device application 114*a* (e.g., by selecting an answer using a touch screen or a mouse, or by inputting text data using a keyboard). After the survey respondent 120*a* replies to a textual query (within a digital survey) using the respondent device application 114*a* the respondent device application 114*a* instructs the respondent device 112*a* to send a data packet representing a response to the server device(s) 106. Upon receipt of the data packet, the survey system 104 directs the storage and analysis of the data packet to the XM input processing system 102. For instance, the survey system 104 passes the data packet to the XM input processing system 102 to send to the large language model 105 along with a defined prompt. In response, the XM input processing system 102 receives model outputs from the large language model 105 and sends the model outputs to the administrator device 108 or to the respondent devices 112 via the server device(s) 106.

Turning now to FIG. 2, this figure provides an overview of the XM input processing system 102 receiving a model output in accordance with one or more embodiments. Specifically, FIG. 2 illustrates a representation of various components that the server device(s) 106, the administrator device 108, or the respondent devices 112 perform to, among other things, collect, convert, analyze, and send data (e.g., outputs). For instance, in some embodiments, the server device(s) 106, administrator device 108, or respondent devices 112 include computer-executable instructions that, when executed by a processor thereon, cause the server device(s) 106, administrator device 108, or respondent devices 112 to perform one or more of the acts described below and shown in FIG. 2.

For ease of reference, the following paragraphs describe the XM input processing system 102 as performing one or more of the acts described below rather than the server device(s) 106. As suggested above, the XM input processing system 102 comprises computer-executable instructions that cause the server device(s) 106 to perform one or more of the acts described below. Rather than repeatedly describe the relationship between the instructions within the XM input processing system 102, on the one hand, and the server device(s) 106, on the other hand, this disclosure will describe the XM input processing system 102 as performing the acts as a shorthand for that relationship. Additionally, while the paragraphs below often describe the acts of the XM input processing system 102 in relation to a single digital survey question, or a single digital journey, certain embodiments of the acts described below involve multiple digital survey questions, multiple digital journeys, and/or multiple responses.

As discussed above, the XM input processing system 102 defines a prompt to reference dynamic experience data content. In one or more embodiments, the XM input processing system 102 receives experience data content from one or more respondent devices. For instance, experience data content includes a survey response(s) or digital journey data. Additional details regarding the survey response and the digital journey data are described below in FIG. 3.

As shown in FIG. 2, the XM input processing system 102 defines a prompt to generate a defined prompt 200. In one or more embodiments, the XM input processing system 102 defines a prompt for a large language model 206. In particular, defining a prompt includes indicating specific instructions to guide the generation of a model output. For instance, the XM input processing system 102 defines the prompt to include context and guidance for the large language model 206 to understand an objective or goal of generating the model output. Further, in some embodiments the XM input processing system 102 defines a prompt to guide the model output of the large language model 206 in regard to a specific format. In addition to the format, the XM input processing system 102 defines a prompt to include an indication to the large language model 206 to perform certain actions. For instance, this can include the XM input processing system 102 via the large language model 206 determining responsive engagement factors, experience data content categories, and/or tasks (e.g., summarizing or translating) for subsequently received data.

Further, as shown in FIG. 2, the XM input processing system 102 also sends an experience data instance 202 to the large language model 206. In one or more embodiments, the XM input processing system 102 receives the experience data instance 202 from a respondent device. For instance, the experience data content includes multiple experience data instances. Further, the experience data instance 202 includes a single survey response that corresponds to the respondent device, or a single digital journey that corresponds to the respondent device.

As shown in FIG. 2, the XM input processing system 102 combines the experience data instance 202 and the defined prompt 200 into a data packet 204. In one or more embodiments, the data packet 204 includes a unit of data transmitted over a network that includes the information relating to both the experience data instance 202 and the defined prompt 200. Furthermore, the data packet 204 also includes other control information necessary for delivery to the large language model 206. For instance, the data packet 204 typically includes a header that labels the source and a payload that contains the experience data instance 202 and the defined prompt 200.

As just mentioned, and as shown in FIG. 2, the XM input processing system 102 sends the data packet 204 to the large language model 206. For example, the large language model 206 includes artificial intelligence models capable of processing and generating natural language text. In particular, large language models are trained on large amounts of data to learn patterns and rules of language. As such, large language models post-training are capable of generating text similar in style and content to input data. Examples of large language models include ChatGPT, BLOOM, Bard AI, LaMDA, or DialoGPT. In some embodiments, large language models can include models considered to include artificial intelligence features.

As also shown in FIG. 2, in one or more embodiments the XM input processing system 102 sends contextual data 208 to the large language model 105. For instance, the XM input processing system 102 directly sends the contextual data 208 to the large language model 206 or sends the contextual data 208 as part of the data packet 204 to the large language model 206. Additional details relating to the contextual data 208 is given below in the description of FIG. 4.

As further shown in FIG. 2, the XM input processing system 102 receives a model output 210 from the large language model 206. For instance, the XM input processing system 102 receives the model output 210 based on the experience data instance 202 (e.g., the survey response, or the digital journey) and the defined prompt 200. In particular, the XM input processing system 102 sends the experience data instance 202 to the large language model 206, and the large language model 206 generates the model output 210 by analyzing the experience data instance 202 according to the defined prompt 200. Moreover, the model output 210 includes at least one of categorizing the experience data instance 202, a summary of the experience data instance 202, a translation of the experience data instance 202, or a combination of the categorization, summary, and/or translation.

Moreover, as shown, FIG. 2 illustrates the XM input processing system 102 response 212 to the model output 210. For example, the response 212 includes acts in response to the model output 210 such as sending the model output 210 to an administrator device, executing programs, activating functions within programs, generating an additional prompt, sending an additional prompt, creating a report, generating a list of recommendations, an email response, a code snippet, a list of recommendations, a digital gift card, a digital coupon, or a bug report.

As mentioned previously, in one or more embodiments, the XM input processing system 102 sends the experience data instance 202 in the moment to the large language model 206 and receives the model output 210 in the moment. For example, in the moment includes milliseconds to a couple of seconds (1 millisecond to 10 seconds). For instance, upon the XM input processing system 102 receiving the experience data instance 202, the XM input processing system 102 passes the data packet 204 to the large language model 206 within the aforementioned time range and receives the model output 210 from the large language model. Accordingly, the whole process of the XM input processing system 102 receiving the model output 210 occurs within the range of 1 millisecond to 10 seconds. Furthermore, in some embodiments, the XM input processing system 102 also sends a message based on a model output from the large language model 206 to a respondent device within a couple of moments (e.g., a time range of a couple of milliseconds to a couple of seconds).

Figure 3:
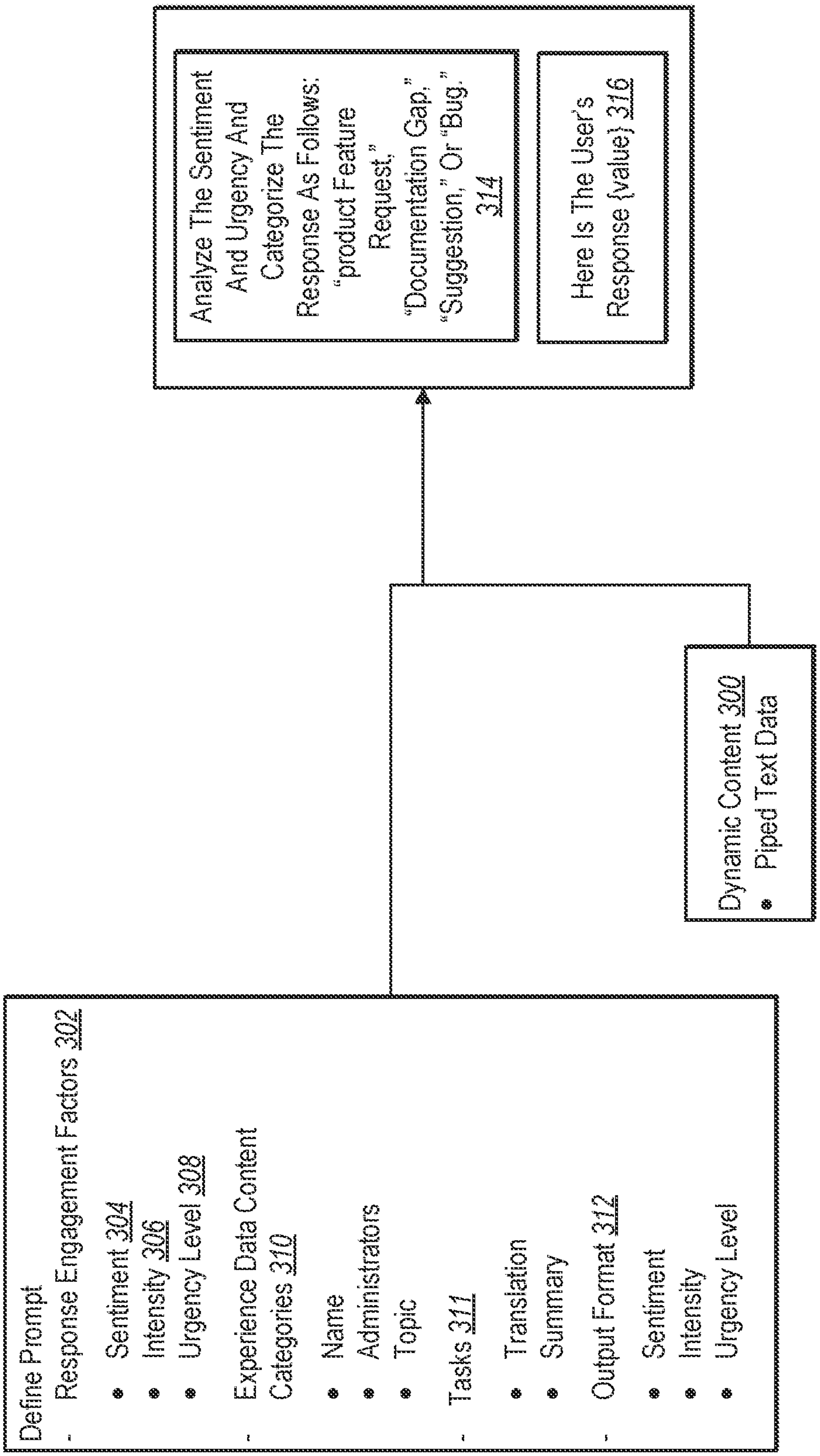
FIG. 3 illustrates the XM input processing system defining a prompt in accordance with one or more embodiments.

Turning now to FIG. 3, this figure depicts additional details relating to the XM input processing system 102 defining a prompt in accordance with one or more embodiments. Specifically, FIG. 3 shows the prompt defining process as including indicating various categories, factors, and formats and also references dynamic content (e.g., experience data instance such as a survey response).

As mentioned above, FIG. 3 describes additional details related to the experience data content. As shown and as mentioned above, the XM input processing system 102 references dynamic experience data content in defining the prompt to send to the large language model. Accordingly, FIG. 3 shows as part of the prompt defining process, dynamic content 300. In some embodiments, the dynamic content 300 includes a survey response, digital journey data, agent-client interaction data, and numerous other types of data events generated by the XM input processing system 102.

In order to receive a survey response, the survey system 104 sends out a digital survey to a respondent device. The term "digital survey" refers to a digital communication that collects information concerning one or more respondents by capturing information from (or posing questions to) such respondents. Accordingly, a digital survey may include one or more digital survey questions. The term "digital survey question" in turn refers to a prompt within a digital communication that invokes a response from a respondent. A digital survey question may include a textual query. The term "textual query" refers to human-readable characters that form a question. For example, a textual query includes interrogative sentences (e.g., "How are you?") and imperative sentences (e.g., "Please identify the clothing brand you prefer") written in text. Textual queries may come in various formats, including but not limited to, multiple choice, open-ended, ranking, scoring, summation, demographic, dichotomous, differential, cumulative, dropdown, matrix, net promoter score ("NPS"), single textbox, heat map, or any other type of formatting prompt that invokes a response from a respondent.

In one or more embodiments, the XM input processing system 102 receives the experience data instance from the respondent device as a survey response. For instance, the survey response includes the XM input processing system 102 receiving feedback from a respondent device. Moreover, in some embodiments, the survey response includes a textual response.

In one or more embodiments, the XM input processing system 102 receives the experience data instance from the respondent device as a digital journey. For example, a digital journey includes a sequence of events performed by a respondent of the respondent device. For instance, the digital journey includes the respondent of the respondent device navigating within a specific application. Specifically, the digital journey can include starting at a home page of an application, selecting an element on the home page to transition to a second page of an application, and then selecting the account profile element within the application. Moreover, the XM input processing system 102 can define the digital journey to span a predetermined amount of time and/or steps. Furthermore, the digital journey can include data relating to a sequence of events such as purchase price of an item, browser type, gender, or age group.

In one or more embodiments, the XM input processing system 102 receives the experience data instance as an agent-client interaction. For example, agent-client interaction data includes conversations extracted from a phone call (e.g., digital or analog), conversations between an agent and client on a mobile/web application or a messaging application (e.g., email), or an interaction between an agent and client on a social media application. For instance, the agent-client interaction includes in a call center environment an agent finishes a call with a client and queries a call summary from the XM input processing system 102. In some such embodiments, the XM input processing system 102 receives from the large language model a suggestion to take specific automated actions based on the call summary.

Moreover, as mentioned, FIG. 3 shows as part of the prompt defining process, indicating responsive engagement factors 302. In one or more embodiments, the XM input processing system 102 defines a prompt to indicate to the large language model to determine the responsive engagement factors 302 of an experience data instance. In particular, the responsive engagement factors 302 include a sentiment 304, an intensity 306, and/or an urgency level 308.

In one or more embodiments, the sentiment of an experience data instance includes the underlying emotion or attitude conveyed. For instance, the sentiment of the experience data instance includes an emotional tone such as positive, negative, or neutral. Further, the disclosed system receives the determined sentiment of the experience data instance to make further decisions such as sending the experience data instance to a specific administrator client device.

In one or more embodiments, the intensity of an experience data instance includes the strength or degree of the sentiment expressed. For instance, the intensity indicates the level of positive, negative, or neutral from the sentiment of the experience data instance. Further, for a statement such as "I liked using the product" versus "I absolutely loved using the product" both include positive sentiment, however the latter statement includes a higher intensity level. Specifically, in some embodiments the XM input processing system 102 indicates to the large language model to rank the intensity of the experience data instance from a scale of 1-10.

In one or more embodiments, the urgency of an experience data instance includes a level of priority of the experience data instance. For instance, the urgency includes categories such as low priority, mid priority, and high priority. Furthermore, the XM input processing system 102 indicates to the large language model to determine the urgency of an experience data instance. Although the above outlines responsive engagement factors 302 (e.g., enrichments) that include, but is not limited to, the sentiment 304, the intensity 306, and/or the urgency level 308, in some embodiments, the responsive engagement factors 302 further include (but are not limited to) actionability, emotion, emotional intensity, effort, loyalty, profanity, measurements (e.g., weight, distance, etc.), currency, conversation outcomes, participant outcomes, empathy scores, reasoning, perspective, contextual information, modality (e.g., level of certainty), audience awareness (e.g., what group is the message tailored for), emphasis, attitude, intent, cultural references, clarity, and mood.

Further, FIG. 3 shows as part of the prompt defining process, indicating experience data content categories 310. In one or more embodiments, the XM input processing system 102 determines the experience data content categories 310 via the large language model. For instance, the XM input processing system 102 in defining the prompt indicates to the large language model to classify the experience data instance according to a set of predetermined categories. Specifically, in some embodiments the experience data content categories 310 include feature requests, improvement suggestions, bugs, setup issues, missing instructions, or other. Further, in some embodiments, the experience data content categories 310 includes identifying a name of the respondent (e.g., respondent in a call center environment, a respondent of a digital survey, or a respondent interacting with web data which is captured as a digital journey), and a relevant administrative client device.

Moreover, FIG. 3 shows as part of the prompt defining process, indicating tasks 311. In one or more embodiments, tasks 311 includes performing an action related to the experience data instance. For instance, the tasks 311 can include an indication to the large language model to summarize the experience data instance, to translate the experience data instance, and/or to draft a response to the experience data instance.

Further, FIG. 3 shows as part of the prompt defining process indicating an output format 312. For instance, the output format 312 includes indicating to the large language model to generate the model output in a specific structure. To illustrate, the output format 312 includes for example JSON, XML, CSV, or HTML.

Additionally, FIG. 3 shows a defined prompt 314 based on the prompt defining process discussed above. Specifically, FIG. 3 shows the defined prompt 314 that states: analyze the sentiment and urgency of the response and categorize the response as follows: "product feature request," "documentation gap," "suggestion," or "bug." Further, FIG. 3 shows a dynamic reference 316. For instance, the dynamic reference 316 includes a piped text data value that pulls in a specific response to send the defined prompt 314 along with the specific response. Although FIG. 3 shows a variety of specific factors, categories, and formats, in one or more embodiments, the responsive engagement factors 302, the experience data content categories 310, and the output format 312 can include variations not shown in FIG. 3.

Figure 4:
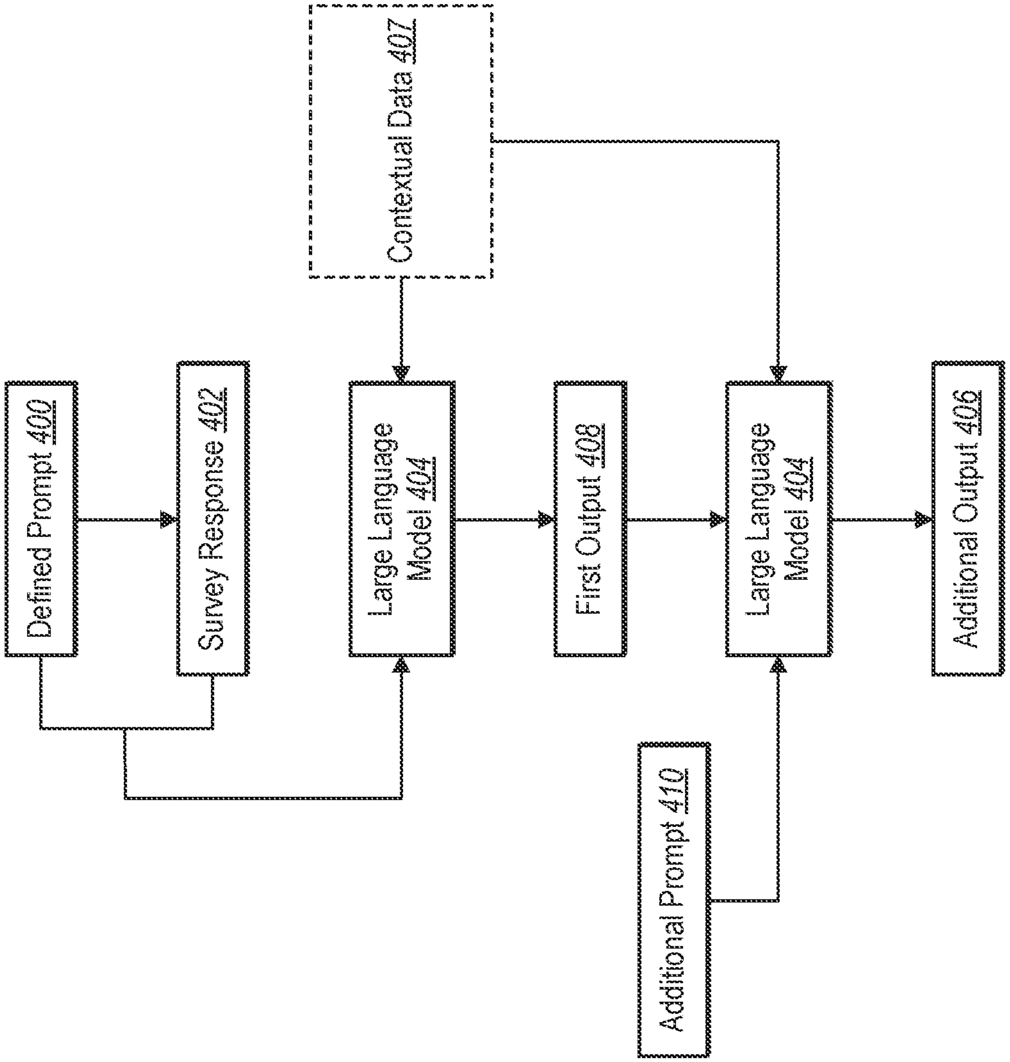
FIG. 4 illustrates a diagram of the XM input processing system feeding the model output in a subsequent step back into the large language model in accordance with one or more embodiments.

FIG. 4 shows the XM input processing system 102 feeding a model output back to a large language model with an additional prompt in accordance with one or more embodiments. Specifically, FIG. 4 shows the XM input processing system 102 utilizing a model output in additional steps to generate additional outputs for downstream tasks.

As previously discussed, FIG. 4 shows the XM input processing system 102 sending a defined prompt 400 and a survey response 402 to a large language model 404. As mentioned above, and as shown in FIG. 4, the XM input processing system 102 also sends contextual data 407 to the large language model 404. In one or more embodiments, the XM input processing system 102 identifies contextual data 407 that corresponds with the respondent device. Specifically, the contextual data 407 includes additional information apart from the experience data instance that corresponds with the respondent device. For instance, the contextual data 407 includes the XM input processing system 102 identifying previously received experience data instances received from the same respondent device.

In one or more embodiments, the XM input processing system 102 sends the contextual data 407 to the large language model 404 by dynamically referencing contextual data sources. Specifically, the XM input processing system 102, as part of defining the prompt references as part of the dynamic content contextual data sources associated with user accounts, such as referencing data streams that continuously capture previous respondent actions or interactions.

Additionally, in some embodiments, the contextual data 407 includes the XM input processing system 102 identifying previous digital journey data captured from the same respondent device. Furthermore, in some embodiments, the contextual data 407 includes integration of applications that capture a respondent's activities. For instance, by integrating applications that capture a respondent's activities, the prompt defining process can include dynamic references to specifically integrated applications to draw data that references a specific respondent. In other words, the XM input processing system 102 feeds information from sources in addition to the experience data instance to the large language model 404.

As also discussed previously, the XM input processing system 102 receives from the large language model 404 a first output 408 (e.g., a model output as discussed in FIG. 2). Based on receiving the first output 408, the XM input processing system 102 determines to perform additional downstream acts. For instance, these acts include the XM input processing system 102 feeding the first output 408 as input back to the large language model 404 with an additional prompt 410.

In one or more embodiments, the additional prompt 410 includes the XM input processing system 102 defining a prompt to indicate the generation of a translation, an email or message via a messaging application, a digital gift card, a digital coupon, a code snippet, a function call, a list of recommendations, and/or a bug report. For instance, in defining the additional prompt 410 to indicate the generation of an email, the XM input processing system 102 indicates to use property values from the first output 408 to create a personalized email response. Specifically, the additional prompt 410 can include highlighting the specific problem identified from the experience data instance, the relevant administrative client devices that will address the problem, and the format/structure of the email along with information for providing additional feedback. Similarly, in some embodiments, defining the additional prompt 410 to indicate the generation of a message includes a similar process as just described, however, the format can be structured according to a specific messaging application.

In some instances, the additional prompt 410 includes an indication to generate a translation of text. Specifically, the additional prompt 410 indicates to translate the first output 408 to a second language. Further, in some instance, the additional prompt 410 includes an indication to generate a digital gift card. For example, the XM input processing system 102 in defining the additional prompt 410 uses property values from the first output to draft a tailored apology addressing the identified issue and an embedded link for a digital gift card. In particular, to include the embedded link for the digital gift card, in one or more embodiments, the XM input processing system 102 integrates an application that creates digital gift cards. In doing so, the additional prompt 410 dynamically references the digital gift card application.

Further, in some embodiments, the additional prompt 410 includes an indication to generate a code snippet. Specifically, the additional prompt 410 includes the indication to generate a code snippet based on the first output 408 property values. For instance, the code snippet executes specific tasks such as fixing a product feature, changing a user interface, or updating account information based on an issue identified within the first output 408. Furthermore, in some instances, the XM input processing system 102 receives the code snippet to send it to an administrator client device.

In one or more embodiments, the additional prompt 410 includes an indication to generate a function call that conforms with an application programming interface (API) specification. In some such embodiments, the indication to generate the function call allows the XM input processing system 102 to take different actions based on the function call. Accordingly, the function call further enhances the flexibility of the XM input processing system 102 to execute actions previously undetermined.

Moreover, in some embodiments, the additional prompt 410 includes an indication to generate a list of recommendations. Specifically, the additional prompt 410 includes generating a list of recommendations based on the property values of the first output 408. For instance, the list of recommendations includes action points for an administrator client device to perform or other possibilities such as sending a digital gift card, sending an apology email, fixing a bug, or any combination of the aforementioned.

As shown in FIG. 4, the XM input processing system 102 sends the additional prompt 410, the first output 408, and in some embodiments the contextual data 407 to the large language model 404. In doing so, the XM input processing system 102 receives additional output 406 (e.g., a second output). Further, based on the additional output 406, the XM input processing system 102 makes a determination to send the additional output 406 to a respondent device, an administrator client device, or to perform other actions (e.g., executing a code snippet).

To illustrate, in one or more embodiments, the additional prompt 410 includes various conditions. For instance, if the XM input processing system 102 receives the first output 408 with a negative sentiment regarding a certain product feature (e.g., as identified by the large language model 404), the additional prompt 410 can include an indication to the large language model 404 to generate a ticket that identifies specific bug features in the survey response 402, where the ticket is formatted specifically for a bug reporting application.

In some instance, the XM input processing system 102 receives the survey response 402 that includes a posted review on the internet (e.g., Google reviews, Yelp, etc.). In this instance, as part of sending the survey response 402 along with the defined prompt 400, the XM input processing system 102 can also send the contextual data 407 that includes previous responses to internet reviews. By feeding this type of contextual data to the large language model 404, the large language model 404 can generate a response with a similar tone, brand, and attitude that matches previous responses to internet reviews.

Figure 5:
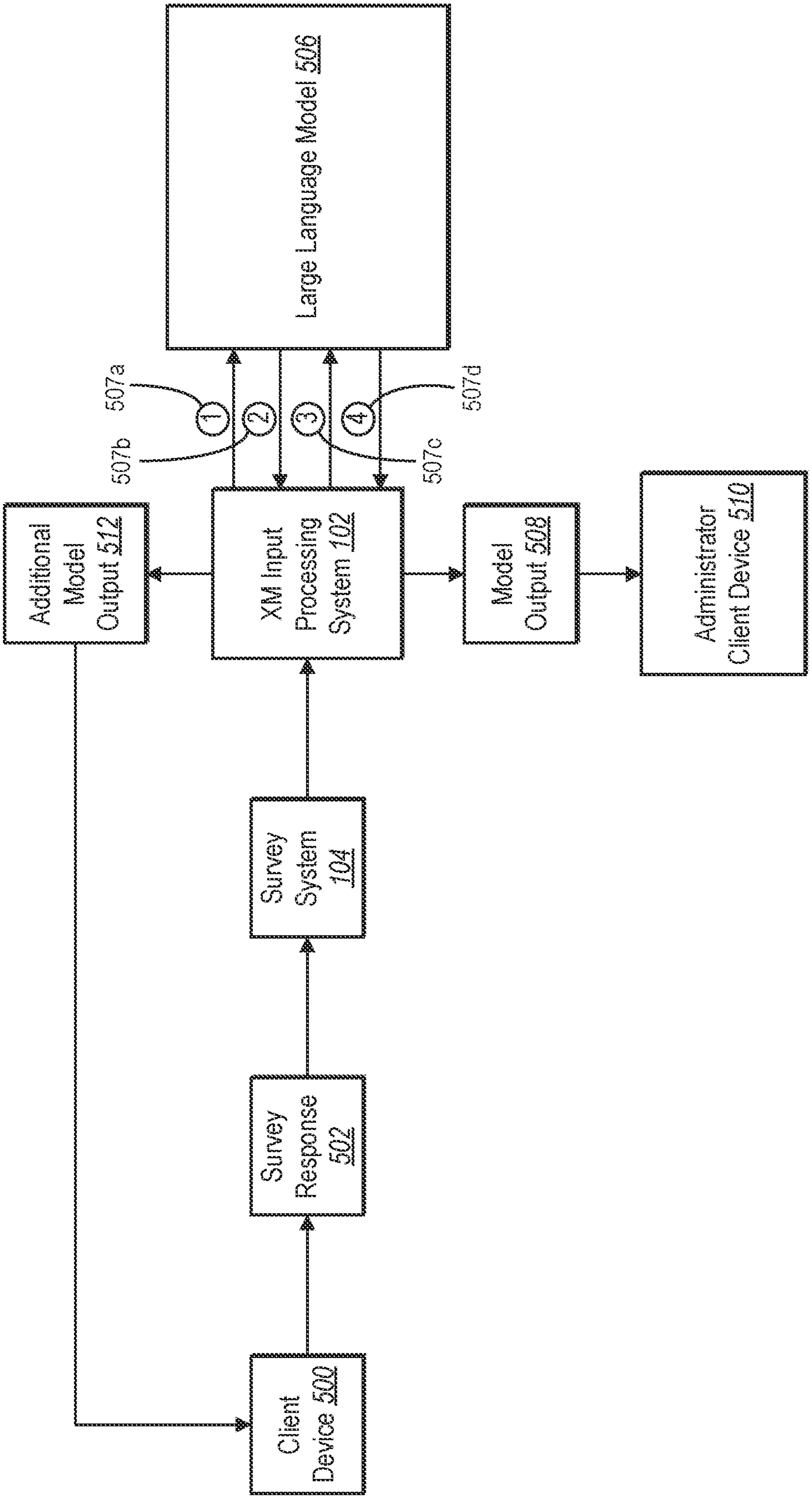
FIG. 5 illustrates a sequence-flow diagram of the XM input processing system receiving various outputs for a survey response in accordance with one or more embodiments.

FIG. 5 illustrates a specific example of the XM input processing system 102 receiving a survey response and subsequent acts performed by the XM input processing system 102 in accordance with one or more embodiments. Specifically, FIG. 5 illustrates the XM input processing system 102 generating a model output based on a survey response.

As discussed previously, FIG. 5 shows a respondent device 500 generating a survey response 502 and the survey system 104 receiving the survey response 502. Specifically, the survey system 104 receives the survey response 502 as discussed above in relation to FIG. 1 and processes the survey response 502 by sending it to the XM input processing system 102.

As shown, FIG. 5 illustrates a series of acts/steps between the XM input processing system 102 and a large language model 506. For instance, FIG. 5 shows a first step **507*a* between the XM input processing system 102 and the large language model 506. In particular, the first step 507*a* includes the XM input processing system 102 sending the survey response 502 along with a defined prompt to the large language model 506. Further, a second step 507*b* includes the XM input processing system 102 receiving from the large language model 506 a model output 508 (e.g., a first output) as shown in FIG. 5. In particular, the XM input processing system 102 can determine to send the model output 508 to an administrator client device 510. To illustrate, this can be based on the model output 508 indicating that the relevant segment of the survey response 502 relates to the engineering team and the administrator client device 510** being part of the engineering team.

Further, FIG. 5 shows a third step **507*c* which includes the XM input processing system 102** sending the model output 508 along with an additional defined prompt back to the large language model 506. In particular, as previously discussed, the additional defined prompt instructs the large language model 506 to generate an additional output based on the model output 508 according to the specifics of the additional defined prompt. Moreover, FIG. 5 shows a fourth step 507*d* which includes the XM input processing system 102 receiving an additional model output 512 (e.g., a second output) from the large language model based on the additional defined prompt and the model output 508. In response to receiving the additional model output 512 (e.g., an email, a digital gift card, a digital coupon, etc.), the XM input processing system 102 determines to send the additional model output 512 to the respondent device 500.

Figure 6:
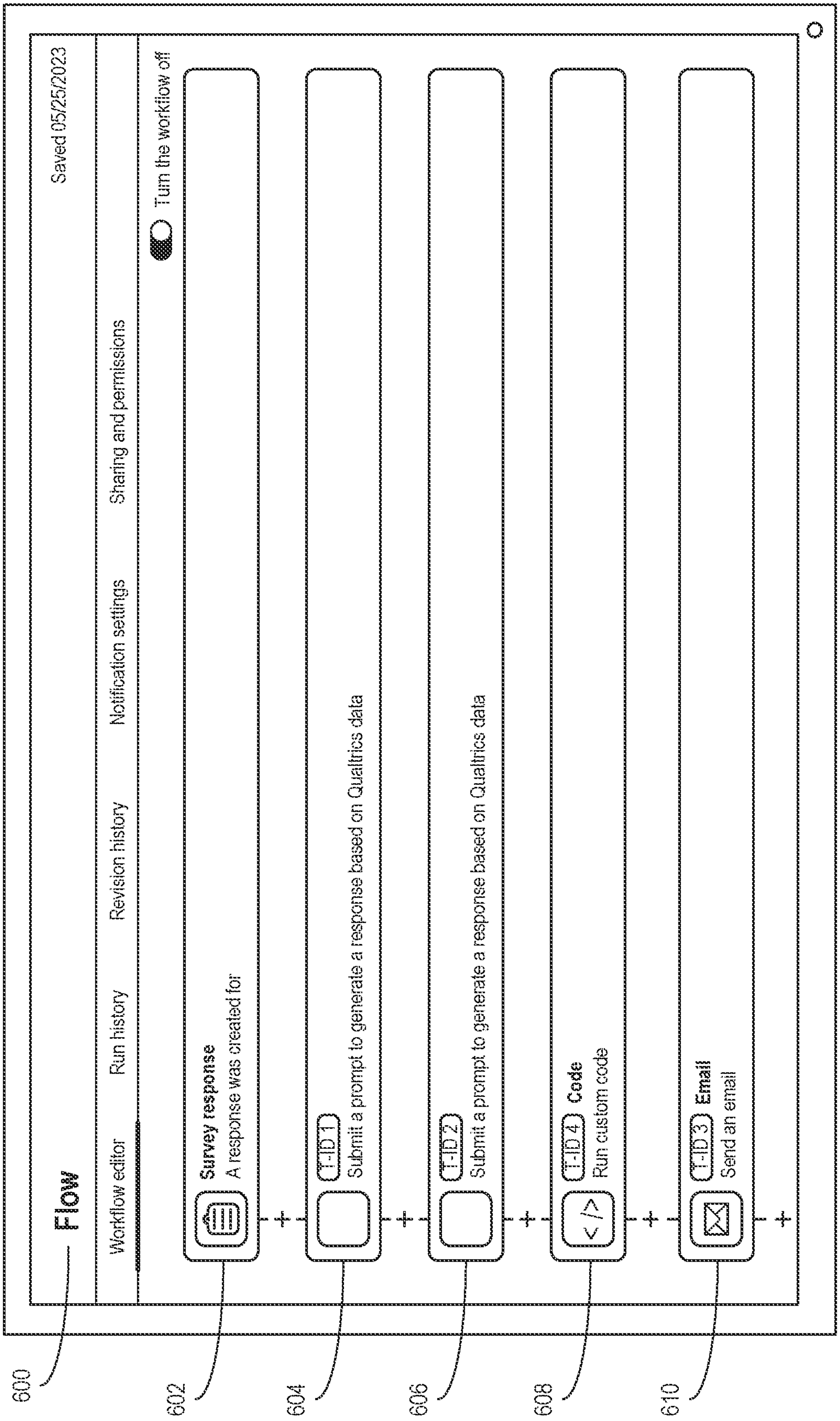
FIG. 6 illustrates a graphical user interface of an administrator generating various steps within a workflow configuration interface in accordance with one or more embodiments.

FIG. 6 shows the XM input processing system 102 providing a workflow editor via a graphical user interface of an administrator client device to create different steps for analyzing data in accordance with one or more embodiments. Specifically, FIG. 6 shows the XM input processing system 102 providing options within the workflow editor to add defined prompts to send to a large language model.

For example, FIG. 6 shows the XM input processing system 102 providing a workflow editor 600 via a graphical user interface where an administrator client device configures various steps for analyzing data and performing actions. For instance, the workflow editor 600 shown in FIG. 6 illustrates an improvement upon conventional digital content providers by providing options to add steps for defining prompts and sending the defined prompt along with an survey response to the large language model.

As shown, FIG. 6 illustrates a step 602 of the workflow editor 600 which shows a dynamically received survey response (e.g., the survey response varies based on the respondent). Similar to above, the workflow editor 600 indicates that the XM input processing system 102 receives the survey response at the step 602 and eventually sends the survey response to a large language model. Further, as previously discussed, the step 602 references dynamic experience data content (e.g., the XM input processing system 102 references survey responses coming in). In response to receiving the survey response at the step 602, the XM input processing system 102 proceeds to the subsequent step.

As further illustrated, the subsequent step includes a step 604 which shows a defined prompt as part of the workflow editor 600. Accordingly, as previously discussed, the step 604 includes the XM input processing system 102 sending a defined prompt along with the received survey response to the large language model. Further, as shown, FIG. 6 illustrates a step 606 that indicates an additional prompt. As previously discussed, the additional prompt includes the XM input processing system 102 indicating to the large language model to generate an additional output based on an initial output generated by the large language model based on the initial survey response and the defined prompt.

In one or more embodiments, rather than the XM input processing system 102 receiving a defined prompt or an additional defined prompt (e.g., steps 604 or 606), the XM input processing system 102 provides pre-defined options to the administrator client device. For instance, the pre-defined options include summarizing text, composing a reply to customer feedback, categorizing text, and/or translating text. Accordingly, selecting one or more of the pre-defined options allows the administrator client device to utilize pre-defined prompts and expedites the process for analyzing incoming data.

Further, FIG. 6 shows a step 608 which includes running custom code. For instance, the step 608 includes the administrator client device specifying specific acts to perform or code to execute based on receiving model output(s) from the large language model. Specifically, in some embodiments, the step 608 includes the administrator client device requiring approval of a model output (e.g., an email) prior to sending an email. Further, the step 608 includes the XM input processing system 102 running code to send a notification to a relevant administrator client device to approve or deny an email generated by the large language model.

For instance, the step 608 can include the XM input processing system 102 sending a notification to a relevant administrator client device to approval sending an email to a respondent within a predetermined time frame (e.g., 1 minute to 30 minutes) and if the administrator client device fails to approve within the time frame, not sending the email. Alternatively, in some embodiments, the step 608 includes sending a notification to the administrator client device to approve sending an email to a respondent within a predetermined time frame, and if the administrator client device fails to approve within the time frame, automatically sending the email.

Moreover, in one or more embodiments, the step 608 includes executing code based on the model output to create a bug report. For instance, if the survey response included a bug report for a specific feature, the XM input processing system 102 can receive an additional model output that has a code snippet relevant to the survey response. Moreover, the step 608 can include the XM input processing system 102 running code to generate a bug report for the issue and including the code snippet in the bug report for the engineering team to review. Similar approval/denial mechanisms can be configured for other actions such as creating a bug report, sending a digital gift card, drafting an apology email, sending a message via a messaging application, or responding to an internet review.

Additionally, as shown in FIG. 6, the workflow editor 600 includes a step 610 which includes sending an email. For instance, the step 610 includes the XM input processing system 102 sending an email to a respondent device (e.g., the respondent device who submitted the survey response) based on the email generated by the large language model and received by the XM input processing system 102. As mentioned previously, the large language model generates the email based on the defined prompts and the survey response.

Moreover, although FIG. 6 shows a specific number of steps within the workflow editor 600, in one or more embodiments, the XM input processing system 102 provides options to add any number of additional steps or to remove any number of steps shown in FIG. 6. For instance, the XM input processing system 102 via the workflow editor 600 provides integration options of various applications. Further, by adding a step to the workflow editor 600, the XM input processing system 102 allows for tasks such as extracting contextual data from a specifically integrated application and sending the survey response along with the contextual data and the defined prompt to the large language model.

Furthermore, in one or more embodiments, the XM input processing system 102 provides an option to add a step in the workflow editor 600 for sanitizing a model output from a large language model. For instance, the XM input processing system 102 provides an option to add a step for security precautions such as checking a model output for a SQL injection or other type of malicious data. In doing so, the XM input processing system 102 prevents bad actors from injecting malicious code via the large language model to the respondent device.

Moreover, in one or more embodiments, the XM input processing system 102 provides via the workflow editor 600 an option to run tests for the various steps. For instance, the workflow editor 600 allows a test run to demonstrate the types of model outputs generated by the large language model and to further demonstrate executing code snippets or sending an email.

Figure 7A:
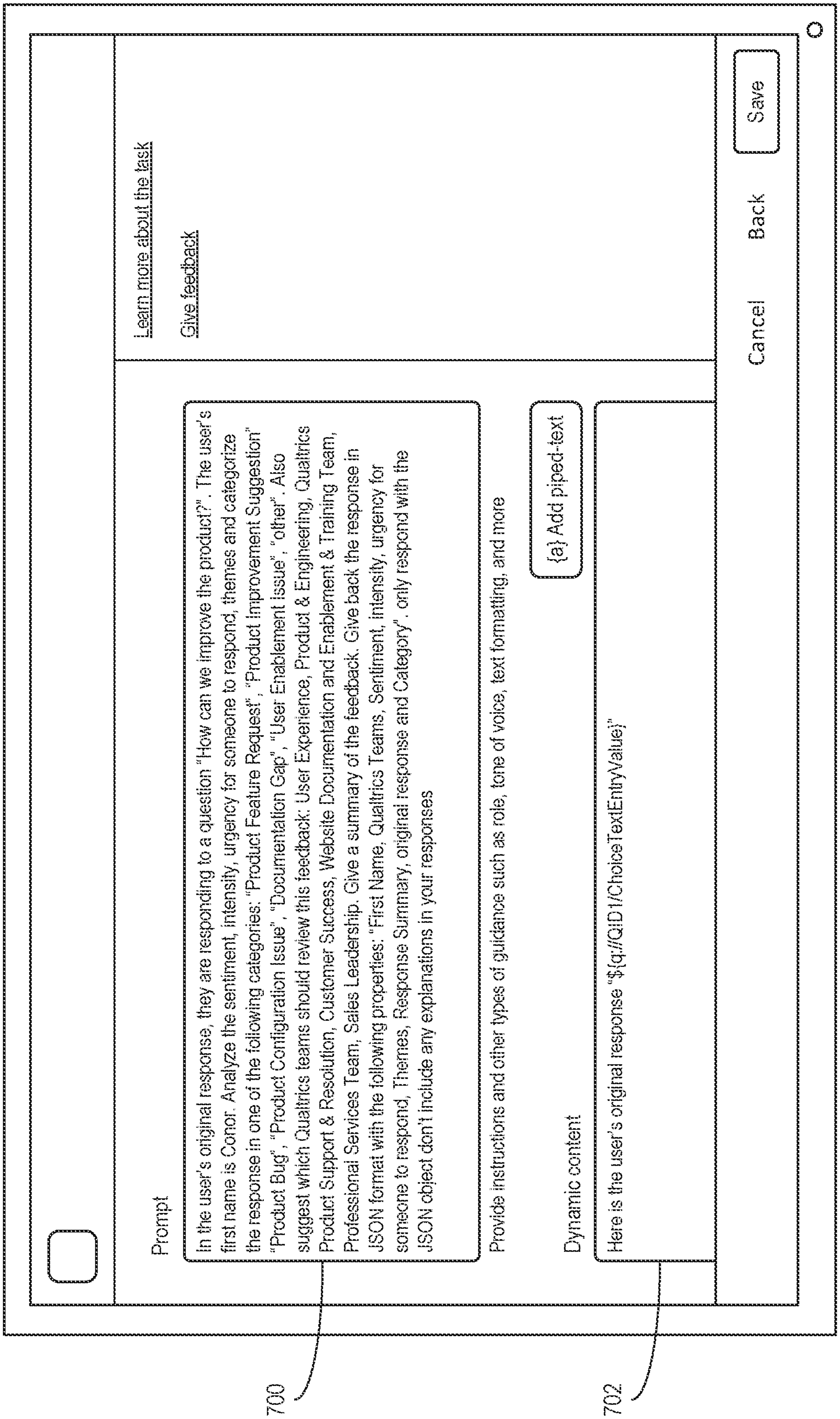
FIG. 7A illustrates a graphical user interface of an administrator defining a prompt and referencing dynamic content in accordance with one or more embodiments.
Figure 7B:
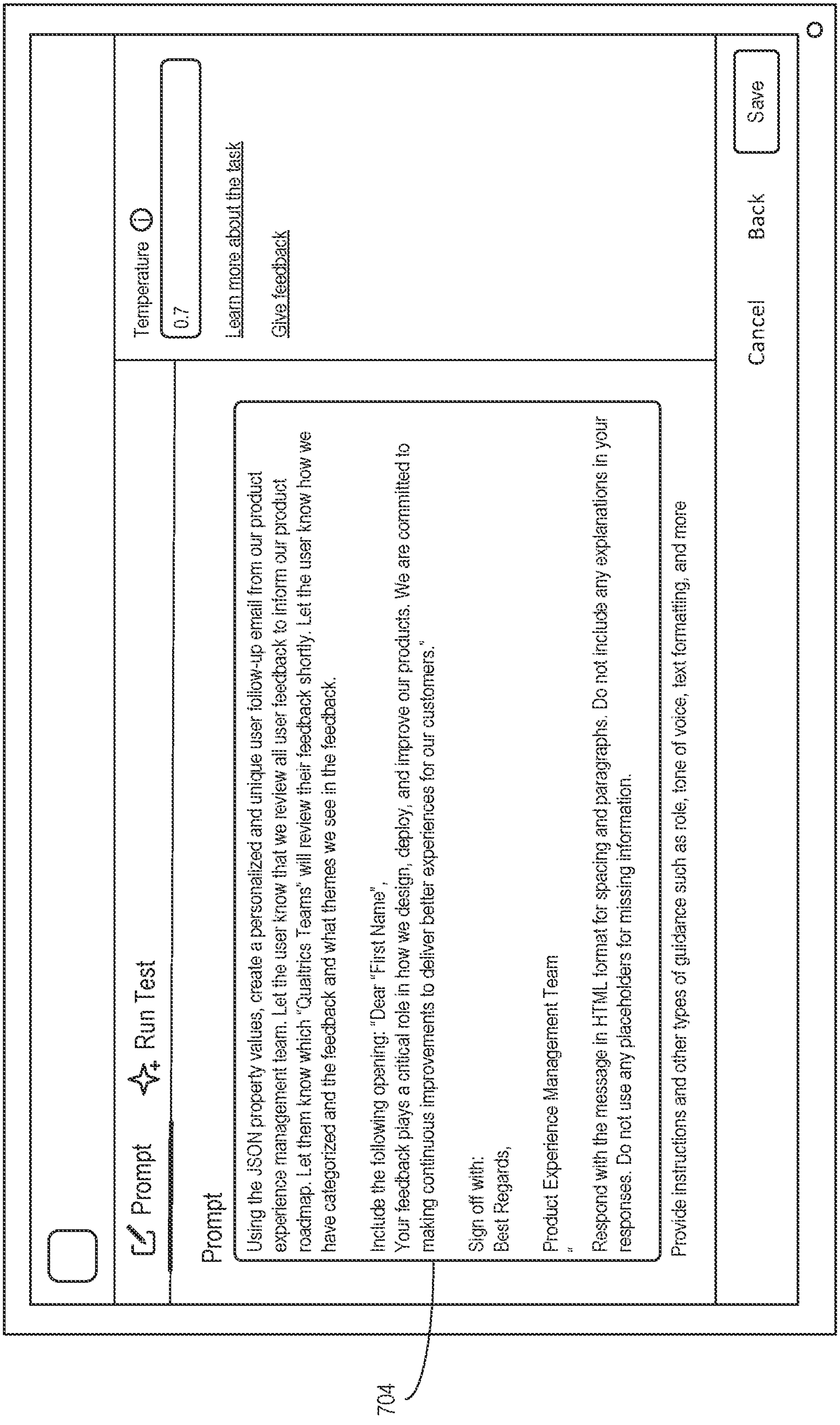
FIG. 7B illustrates a graphical user interface of an administrator defining an additional prompt for generating an output in response to the initial model output in accordance with one or more embodiments.

FIGS. 7A-7B illustrate example graphical user interfaces of the XM input processing system 102 defining prompts via an administrator client device in accordance with one or more embodiments. Specifically, FIG. 7A as discussed above, illustrates the XM input processing system 102 defining an initial prompt for sending to the large language model.

For example, as shown in FIG. 7A, the XM input processing system 102 provides via a graphical user interface an option to define a prompt 700 via the administrator client device. Further, the XM input processing system 102 also provides an option to reference dynamic content to send along with the defined prompt. For instance, the prompt shown in FIG. 7A defines a question type in which the survey response responds to. Specifically, the first part of the prompt 700 definition reads "in the user's original response, they are responding to a question "how can we improve the product?"

Further the XM input processing system 102 defines the prompt 700 to analyze various responsive engagement factors. Specifically, the prompt 700 reads "analyze the sentiment, intensity, urgency for someone to respond, and themes. Moreover, the XM input processing system 102 defines the prompt 700 to categorize the survey response. Specifically, the prompt 700 reads "categorize the response in one of the following categories: product feature request, product improvement suggestion, product bug, product configuration issue, documentation gap, user enablement issue, and other."

Moreover, the XM input processing system 102 defines the prompt 700 to suggest a segment of administrator client devices to review the survey response. Specifically, the prompt 700 reads "also suggest which Qualtrics team should review this feedback: user experience, product and engineering, product support and resolution, customer success, website documentation and enablement/training team, professional services team, or sales leadership."

In addition, the XM input processing system 102 indicates to the large language model to summarize the survey response. Specifically, the prompt 700 reads "give a summary of the feedback." In one or more embodiments, the XM input processing system 102 can provide a variety of instructions such as "translate the feedback to Spanish." Furthermore, the XM input processing system 102 indicates to the large language model to provide a model output in a specific format. Specifically, the prompt 700 reads "give back the response in JSON format with the following properties: first name, team, sentiment, intensity, urgency for someone to respond, themes, response summary, original response, and category. Only respond with the JSON object, don't include any explanations in your responses."

Moreover, as previously discussed, FIG. 7A shows dynamic content 702 which indicates to the XM input processing system 102 to reference a specific respondent's survey response/data. Specifically, FIG. 7A recites "here is the user's original response "${q://QID1/ChoiceTextEntryValue}" which points to a specific location within a platform for referencing information such as a survey response. Moreover, as discussed, the dynamic content 702 can reference various integrated applications to draw upon contextual data.

As mentioned above, FIG. 7B also shows the XM input processing system 102 defining an additional prompt 704 via an administrator client device. For instance, FIG. 7B shows the XM input processing system 102 defining the additional prompt 704 using an initial model output from the large language model. Specifically, the additional prompt 704 specifies to the large language model to generate an email output tailored to the model output generated based on the prompt 700.

For example, as shown in FIG. 7B, the additional prompt 704 reads "using the JSON property values, create a personalized and unique user follow-up email from our product experience management team. Let the user know that we review all user feedback to inform our product roadmap. Let them know which "Qualtrics Teams" will review their feedback shortly. Let the user know how we have categorized the feedback and what themes we see in the feedback." Furthermore, the additional prompt 704 also includes "include the following opening: "Dear 'First Name', your feedback plays a critical role in how we design, deploy, and improve our products. We are committed to making continuous improvements to deliver better experiences for our customers." Sign off with "best regards, Product Experience Management Team". Moreover, the additional prompt 704 also includes "respond with the message in HTML format for spacing and paragraphs. Do not include any explanations in your responses. Do not use any placeholders for missing information." By designing the additional prompt 704 as such, the XM input processing system 102 ensures a personalized and tailored email response to the respondent in the moment. Accordingly, via the additional prompt 704, the large language model generates a response for the respondent that is routed to the correct segment and also correctly identifies feedback.

Figure 8A:
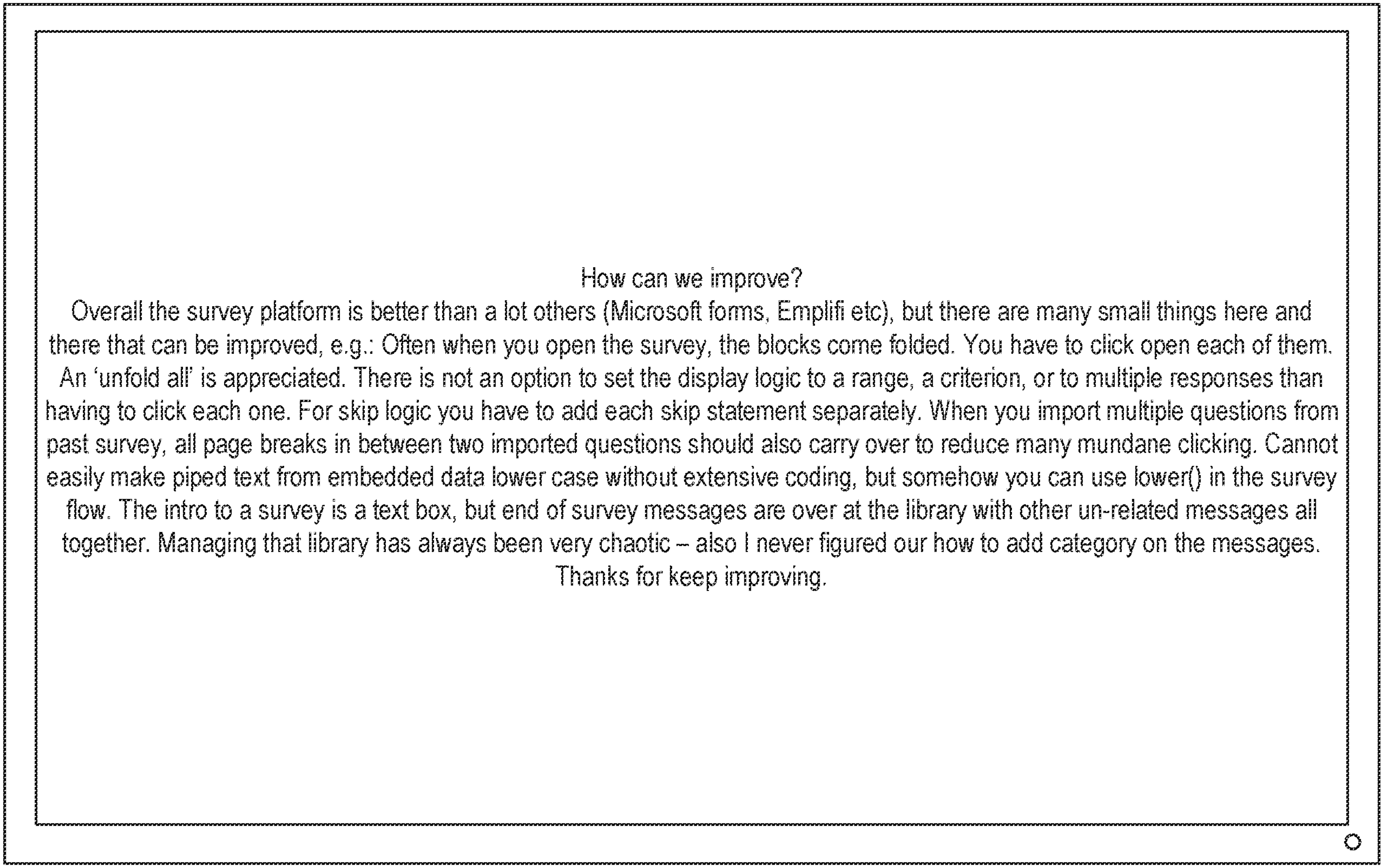
FIG. 8A illustrates an example of a specific survey response received from a user of a respondent device in accordance with one or more embodiments.

FIGS. 8A-8C illustrate examples of a survey response received by the XM input processing system 102 and model outputs received from the large language model in accordance with one or more embodiments. Specifically, FIG. 8A shows a survey response from a respondent submitted to the XM input processing system 102.

For example, FIG. 8A shows that in response to the question "how can we improve?" the XM input processing system 102 receives the following survey response: "Overall the survey platform is better than a lot of others" (Microsoft forms, Emplifi etc), but there are many small things here and there that can be improved, e.g.: often when you open the survey, the blocks come folded. You have to click open on each of them. An 'unfold all' is appreciated. There is not an option to set the display logic to a range, a criterion, or to multiple response than having to click each one. For skip logic you have to add each skip statement separately. When you import multiple questions from past survey, all the page breaks in between two imported questions should also carry over to reduce many mundane clicking. Cannot easily make piped text from embedded data lower case without extensive coding, but somehow you can use lower( ) in the survey flow. The intro to a survey is a text box, but end of survey messages are over at the library with other un-related messages all together. Managing that library has always been very chaotic—also I never figured out how to add category on the messages. Thanks for keep improving."

As indicated by the example survey response in FIG. 8A, the survey response is quite long, convoluted, and riddled with grammatical errors. Furthermore, the example survey response shown in FIG. 8A also requires time and comprehension of the various terms within the response to determine specific points of feedback. As such, conventional digital content providers typically expend a large number of resources to understand survey responses such as the one shown in FIG. 8A.

FIG. 8B shows the XM input processing system 102 receiving from the large language model a model output. Specifically, FIG. 8B shows the model output in JSON format, generated by the large language model according to the definitions shown in FIG. 7A.

For example, FIG. 8B shows a model output from the large language model in response to the survey response shown in FIG. 8A. Further, FIG. 8B shows the model output organized according to “first name,” “Qualtrics teams,” “sentiment,” “intensity,” “urgency for someone to respond,” themes,” “Category, and “response summary.” For instance, the model output received by the XM input processing system 102 identifies the first name as “Conor” and the Qualtrics teams as “product and engineering” and “user experience.” Moreover, the model output identifies the sentiment as neutral, the intensity as low, the urgency for someone to respond as low, and the themes as survey display and functionality, survey logic and skip logic, survey import and management, and survey flow. Further, the model output identifies the category as product improvement suggestions.

Additionally, based on the survey response shown in FIG. 8A, the model output summarizes the survey response as follows: “Conor suggests improvements to the survey platform regarding display, logic, import, and management. They suggest adding an ‘unfold all’ option, setting display logic for ranges or criteria, and carrying over page breaks when importing questions. They also note difficulties in making piped text lower case and managing end of survey messages.” In contrast to the example survey response shown in FIG. 8A, the example model output shown in FIG. 8B demonstrates significant improvements. For instance, rather than tediously parsing through the text shown in FIG. 8A, the XM input processing system 102 receives the model output shown in FIG. 8B with categories, factors, and a summary of the survey response generated by the large language model. By receiving the model output shown in FIG. 8B, the XM input processing system 102 can efficiently and accurately make subsequent decisions (e.g., route the model output to an administrator device or determine how to respond to the survey response).

FIG. 8C shows an additional model output from the large language model in response to the model output discussed in FIG. 8B and the additional defined prompt. Specifically, the large language model generates the additional model output in FIG. 8C according to the additional defined prompt shown in FIG. 7B. As shown in FIG. 8C, the additional model output recites a preset greeting statement. Specifically, the additional model output recites “Dear Conor, your feedback plays a critical role in how we design, deploy, and improve our products. We are committed to making continuous improvements to deliver better experiences for our customers.” Furthermore, the additional model output also identifies the specific teams by reciting “we wanted to let you know that your feedback has been reviewed by the following Qualtrics Teams: Product & Engineering and User Experience.” Additionally, the additional model output identifies categories within the survey response, for example FIG. 8C shows “after categorizing your feedback, we have identified the following themes: survey display and functionality, survey logic and skip logic, survey import and management, and survey flow.

Moreover, the additional model output recites additional text to demonstrate a tailored and personalized email. For example, the additional model output recites “thank you for your suggestions regarding improvements to the survey platform. We particularly appreciate your input on adding an ‘unfold all’ option, setting display logic for ranges or criteria, and carrying over page breaks when importing questions. We will make sure to review these suggestions with our development team.” Accordingly, FIG. 8C demonstrates the XM input processing system 102 receiving a personalized and tailored email response to send to a respondent in the moment (e.g., within a couple of seconds to a minute) based on receiving a survey response or other experience data instance.

Figure 9:
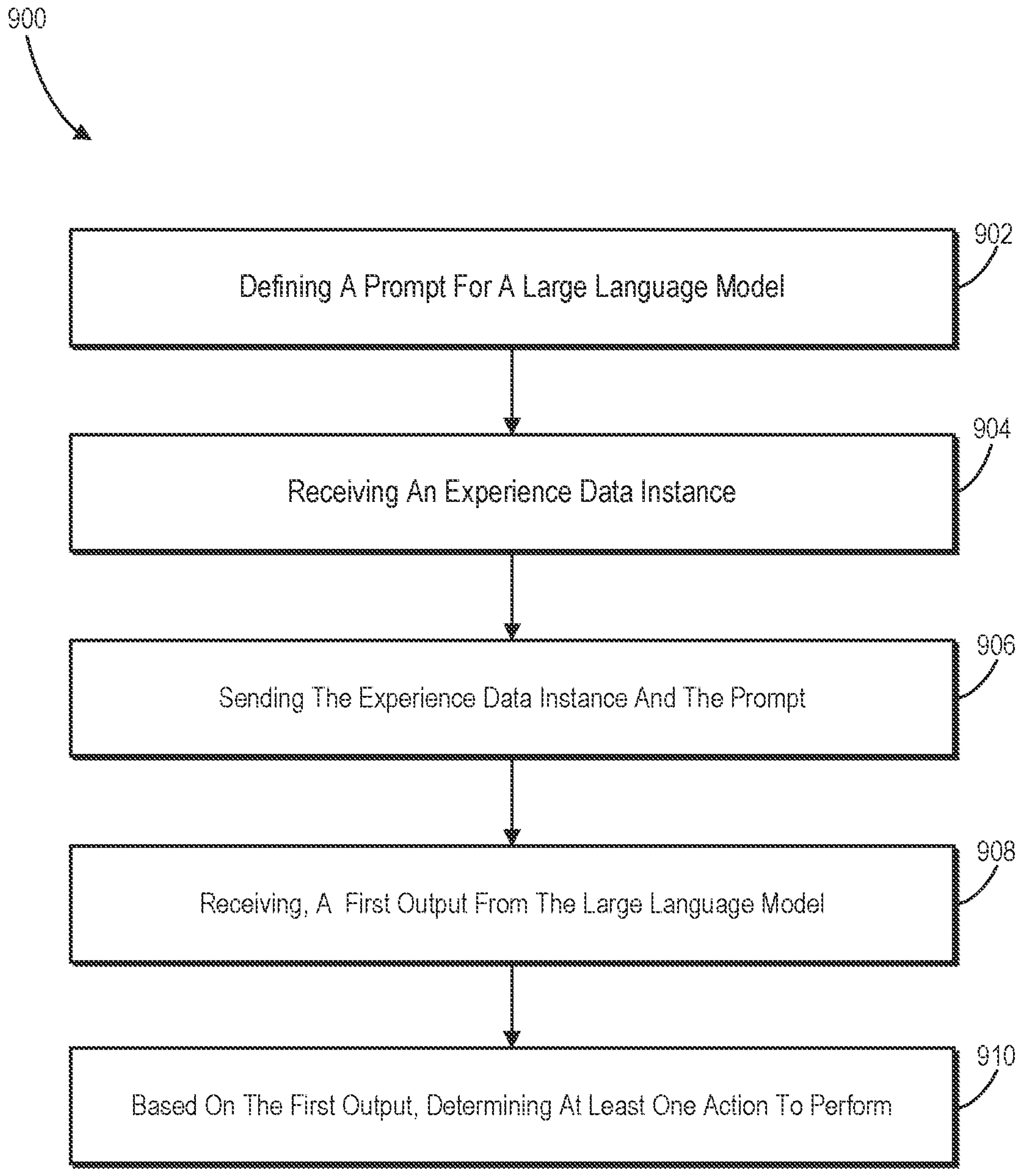
FIG. 9 illustrates a flowchart of a series of acts in a method of receiving a first output and based on the first output, determining at least one action to perform in accordance with one or more embodiments.

Turning now to FIG. 9, this figure illustrates a flowchart of a series of acts 900 of defining a prompt and determining at least one action to perform. While FIG. 9 illustrates acts according to one embodiment, alternative embodiments may omit, add to, reorder, and/or modify any of the acts shown in FIG. 9. In some implementations, the acts of FIG. 9 are performed as part of a method. For example, in some embodiments, the acts of FIG. 9 are performed as part of a computer-implemented method. Alternatively, a non-transitory computer-readable medium can store instructions thereon that, when executed by at least one processor, cause a computing device to perform the acts of FIG. 9. In some embodiments, a system performs the acts of FIG. 9. For example, in one or more embodiments, a system includes at least one memory device. The system further includes at least one server device configured to cause the system to perform the acts of FIG. 9.

As shown in FIG. 9, the series of acts 900 includes an act 902 of defining a prompt for a large language model, an act 904 of receiving an experience data instance, an act 906 of sending the experience data instance and the prompt, an act 908 of receiving, a first output from the large language model, and an act 910 of based on the first output, determining at least one action to perform.

In particular, the act 902 includes defining a prompt for a large language model that references dynamic experience data content, the act 904 includes receiving an experience data instance from a respondent device, the act 906 includes sending the experience data instance with the prompt to the large language model, the act 908 includes receiving, a first output from the large language model, the first output being generated based on the large language model analyzing the experience data instance according to the prompt, and the act 910 includes based on the first output, determining at least one action to perform with respect to the experience data instance.

For example, in one or more embodiments, the series of acts 900 includes defining an additional prompt of the large language model that references the first output. Further, in one or more embodiments, the series of acts 900 includes based on the first output and the additional prompt, receiving a second output from the large language model to send to the respondent device. Moreover, in some embodiments, the series of acts 900 includes wherein the experience data instance comprises one of a survey response, or digital journey data. Additionally, in some embodiments, the series of acts 900 includes indicating a question type associated with the survey response.

For example, in one or more embodiments, the series of acts 900 includes indicating instructions to the large language model to determine responsive engagement factors that comprise at least one of a sentiment of the experience data instance, an intensity of the experience data instance, or an urgency level of the experience data instance. Further, in one or more embodiments, the series of acts 900 includes wherein the dynamic experience data content comprises experience data instances from a plurality of respondent devices. Moreover, in some embodiments, the series of acts 900 includes defining experience data content categories for the large language model. Additionally, in some embodiments, the series of acts 900 includes receiving from the large language model a determined category of the experience data instance based on the defined experience data content categories.

For example, in one or more embodiments, the series of acts 900 includes based on the first output, determining an administrator client device to which to send the first output. Further, in one or more embodiments, the series of acts 900 includes determining, from the first output, responsive engagement factors and experience data content categories. Moreover, in some embodiments, the series of acts 900 includes selecting the administrator client device from a set of administrator devices based on the responsive engagement factors and the experience data content categories. Additionally, in some embodiments, the series of acts 900 includes identifying contextual data relating to the respondent device apart from the experience data instance. Moreover, in some embodiments, the series of acts 900 includes providing the contextual data to the large language model with the experience data instance and the prompt. Further, in some embodiments, the series of acts 900 includes receiving the first output from the large language model, the first output generated based on the contextual data, the prompt, and the experience data instance.

Figure 10:
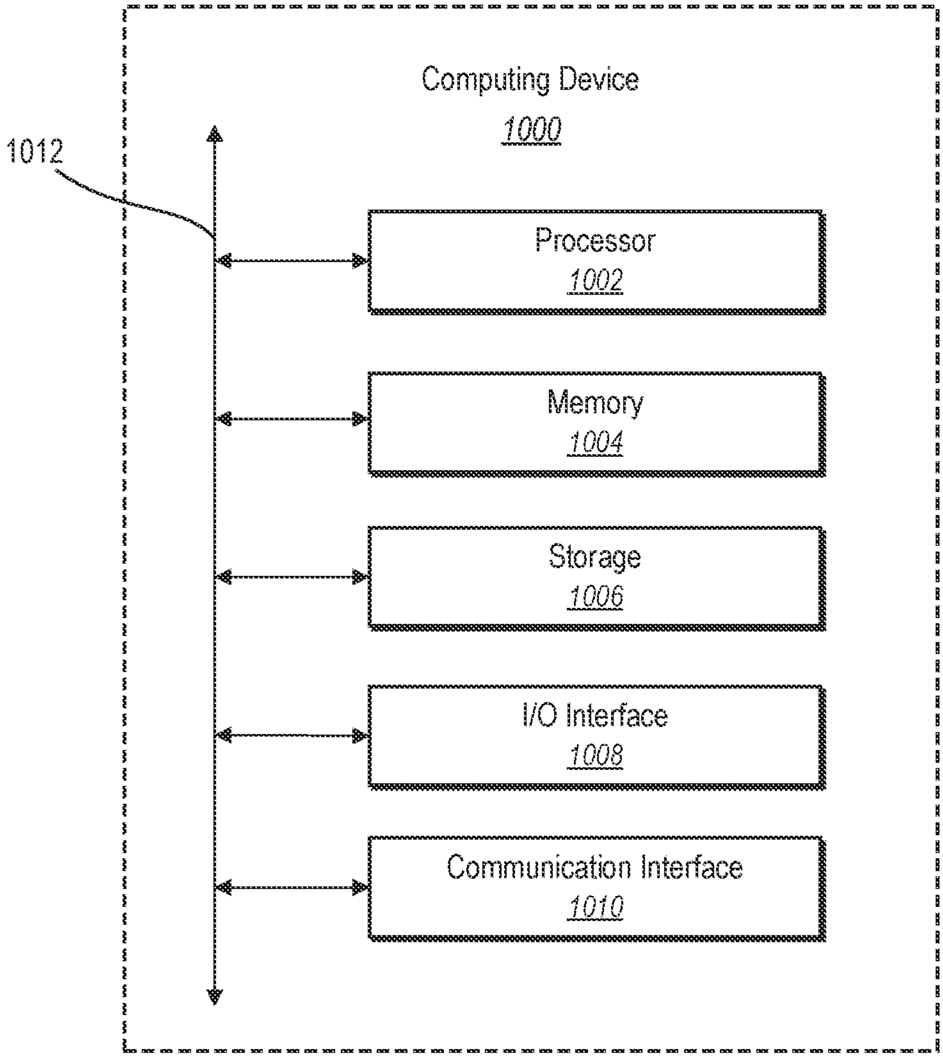
FIG. 10 illustrates a block diagram of a computing device in accordance with one or more embodiments.

FIG. 10 illustrates a block diagram of an exemplary computing device 1000 that may be configured to perform one or more of the processes described above. One will appreciate that one or more computing devices such as the computing device 1000 may implement the server device(s) 106 and/or other devices described above in connection with FIG. 1. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. While the exemplary computing device 1000 is shown in FIG. 10, the components illustrated in FIG. 10 are not intended to be limiting. Additional or alternative components may be used in other embodiments. Furthermore, in certain embodiments, the computing device 1000 can include fewer components than those shown in FIG. 10. Components of the computing device 1000 shown in FIG. 10 will now be described in additional detail.

In one or more embodiments, the processor 1002 includes hardware for executing instructions, such as those making up a computer program. As an example, and not by way of limitation, to execute instructions, the processor 1002 may retrieve (or fetch) the instructions from an internal register, an internal cache, the memory 1004, or the storage device 1006 and decode and execute them. In one or more embodiments, the processor 1002 may include one or more internal caches for data, instructions, or addresses. As an example, and not by way of limitation, the processor 1002 may include one or more instruction caches, one or more data caches, and one or more translation lookaside buffers ("TLBs"). Instructions in the instruction caches may be copies of instructions in the memory 1004 or the storage device 1006.

The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The storage device 1006 includes storage for storing data or instructions. As an example, and not by way of limitation, storage device 1006 can comprise a non-transitory storage medium described above. The storage device 1006 may include a hard disk drive ("HDD"), a floppy disk drive, flash memory, an optical disc, a magneto-optical disc, magnetic tape, or a Universal Serial Bus ("USB") drive or a combination of two or more of these. The storage device 1006 may include removable or non-removable (or fixed) media, where appropriate. The storage device 1006 may be internal or external to the computing device 1000. In one or more embodiments, the storage device 1006 is non-volatile, solid-state memory. In other embodiments, the storage device 1006 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

The I/O interface 1008 allows a user to provide input to, receive output from, and otherwise transfer data to and receive data from the computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example and not by way of limitation, the communication interface 1010 may include a network interface controller ("NIC") or network adapter for communicating with an Ethernet or other wire-based network or a wireless NIC ("WNIC") or wireless adapter for communicating with a wireless network, such as a WI-FI.

Additionally, or alternatively, the communication interface 1010 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, the communication interface 1010 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, the communication interface 1010 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1012 may include hardware, software, or both that couples components of the computing device 1000 to each other. As an example and not by way of limitation, the communication infrastructure 1012 may include an Accelerated Graphics Port ("AGP") or other graphics bus, an Enhanced Industry Standard Architecture ("EISA") bus, a front-side bus ("FSB"), a HYPERTRANSPORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof.

Figure 11:
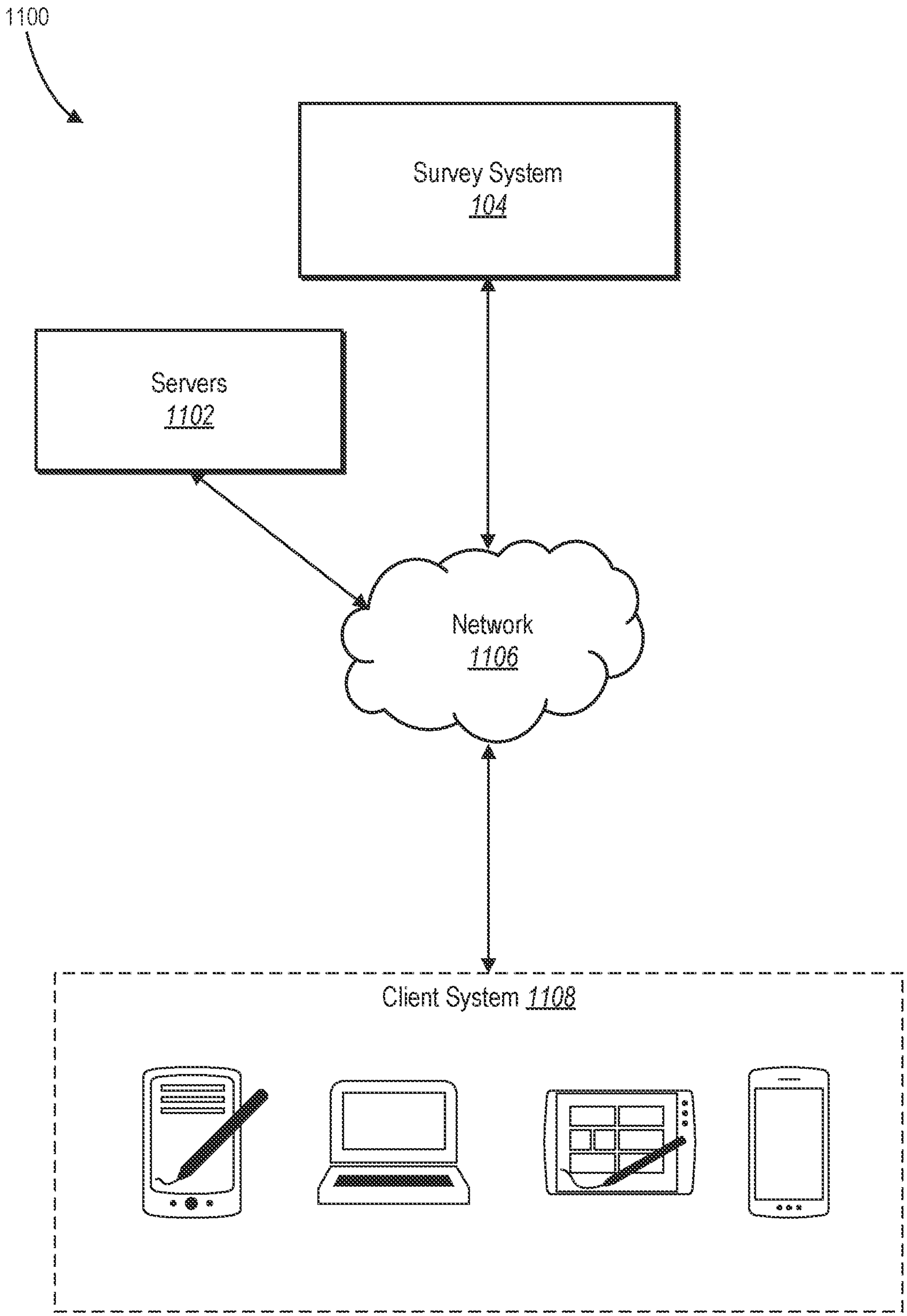
FIG. 11 illustrates a networking environment of a survey system in accordance with one or more embodiments.

FIG. 11 illustrates an example network environment 1100 of the XM input processing system 102. Network environment 1100 includes a client system 1108, and a server device 1102 connected to each other by a network 1106. Although FIG. 11 illustrates a particular arrangement of client system 1108, server device 1102, and network 1106, this disclosure contemplates any suitable arrangement of client system 1108, server device 1102, and network 1106. As an example, and not by way of limitation, two or more of client system 1108, and server device 1102 may be connected to each other directly, bypassing network 1106. As another example, two or more of client system 1108 and server device 1102 may be physically or logically co-located with each other in whole, or in part. Moreover, although FIG. 11 illustrates a particular number of client devices, server devices 1102, and networks 1106, this disclosure contemplates any suitable number of client devices, server devices, and networks. As an example, and not by way of limitation, network environment 1100 may include multiple client devices, server devices, and networks.

This disclosure contemplates any suitable network 1106. As an example and not by way of limitation, one or more portions of network 1106 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1106 may include one or more networks 1106.

Links may connect client device, and server device 1102 to communication network 1106 or to each other. This disclosure contemplates any suitable links. In particular embodiments, one or more links include one or more wireline (such as for example Digital Subscriber Line ("DSL") or Data Over Cable Service Interface Specification ("DOCSIS")), wireless (such as for example Wi-Fi or Worldwide Interoperability for Microwave Access ("WiMAX")), or optical (such as for example Synchronous Optical Network (SONET) or Synchronous Digital Hierarchy ("SDH")) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1100. One or more first links may differ in one or more respects from one or more second links.

In particular embodiments, client system 1108 may be an electronic device including hardware, software, or embedded logic components or a combination of two or more such components and capable of carrying out the appropriate functionalities implemented or supported by client system 1108. As an example, and not by way of limitation, a client system 1108 may include any of the computing devices discussed above in relation to FIG. 11. A client system 1108 may enable a network user at a client device to access network 1106.

In particular embodiments, client system 1108 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client system 1108 may enter a Uniform Resource Locator ("URL") or other address directing the web browser to a particular server (such as server, or a server associated with a third-party system), and the web browser may generate a Hyper Text Transfer Protocol ("HTTP") request and communicate the HTTP request to server. The server may accept the HTTP request and communicate to client system 1108 one or more Hyper Text Markup Language ("HTML") files responsive to the HTTP request. Client system 1108 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server device 1102 may include a variety of servers, sub-systems, programs, modules, logs, and data stores. In particular embodiments, server device 1102 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server device 1102 may also include suitable components such as network interfaces, security mechanisms, load balancers, failover servers, management-and-network-operations consoles, other suitable components, or any suitable combination thereof.

In particular embodiments, server device 1102 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. Additionally, a user profile may include financial and billing information of users (e.g., survey respondents 120, customers, etc.).

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

defining a dynamic experience data content prompt for a large language model that comprises data fields for at least one of response engagement factors, experience data content categories, automated response tasks, and output formats;

receiving a text-based digital survey response from a respondent device;

generating, utilizing a large language model, a first output comprising a structured data packet from the dynamic experience data content prompt and the text-based digital survey response, wherein the structured data packet comprises a header that labels a source and a payload that comprises the data fields from the dynamic experience data content prompt populated with data from the text-based digital survey response;

defining an additional prompt of the large language model that references the first output;

generating, utilizing the large language model with the first output and the additional prompt, a second output from the large language model; and based on the second output, executing at least one action with respect to the text-based digital survey response, wherein the at least one action comprises determining an administrator client device to which to send the first output from a set of administrator devices based on the response engagement factors and the experience data content categories.

2. The computer-implemented method as recited in claim 1, wherein:

receiving the second output from the large language model comprises receiving at least one of a digital gift card, a coupon or a suggested response; and executing the at least one action further comprises routing the second output to a relevant segment of an entity or organization.

3. The computer-implemented method as recited in claim 1, wherein the text-based digital survey response comprises one of feedback response or digital journey data.

4. The computer-implemented method as recited in claim 1, wherein defining the dynamic experience data content prompt for the large language model comprises indicating a question type associated with the text-based digital survey response.

5. The computer-implemented method as recited in claim 1, wherein defining the dynamic experience data content prompt for the large language model comprises indicating instructions to the large language model to determine the response engagement factors representing at least one of a sentiment of the text-based digital survey response, an intensity of the text-based digital survey response, or an urgency level of the text-based digital survey response.

6. The computer-implemented method as recited in claim 1, wherein the text-based digital survey response comprises responses from a plurality of respondent devices.

7. The computer-implemented method as recited in claim 1, further comprising:

receiving from the large language model a determined category of the text-based digital survey response based on the experience data content categories.

8. The computer-implemented method as recited in claim 1, further comprising:

identifying contextual data relating to the respondent device;

providing the contextual data to the large language model with the text-based digital survey response and the dynamic experience data content prompt; and generating the first output from the large language model based on the contextual data, the dynamic experience data content prompt, and the text-based digital survey response.

9. The computer-implemented method as recited in claim 1, wherein executing the at least one action further comprises providing at least one of the first output or the second output to the administrator client device.

10. The computer-implemented method as recited in claim 1, wherein generating the second output further comprises:

generating, based on an indication in the additional prompt, a code snippet based on the data fields of the first output; and providing the code snippet to the administrator client device.

11. A non-transitory computer-readable medium storing instructions that, when executed by at least one processor, cause a computer device to:

define a dynamic experience data content prompt for a large language model that comprises data fields for at least one of response engagement factors, experience data content categories, automated response tasks, and output formats;

receive a text-based digital survey response from a respondent device;

generate, utilizing a large language model, a first output comprising a structured data packet from the dynamic experience data content prompt and the text-based digital survey response, wherein the structured data packet comprises a header that labels a source and a payload comprises the data fields from the dynamic experience data content prompt populated with data from the text-based digital survey response;

define an additional prompt of the large language model that references the first output;

generating, utilizing the large language model with the first output and the additional prompt, a second output from the large language model; and based on the second output, executing at least one action with respect to the text-based digital survey response, wherein the at least one action comprises determining an administrator client device to which to send the first output from a set of administrator devices based on the response engagement factors and the experience data content categories.

12. The non-transitory computer-readable medium of claim 11, further comprising instructions that, when executed by the at least one processor, cause the computer device to:

receive the second output from the large language model by receiving at least one of a digital gift card, a coupon or a suggested response; and route the second output to a relevant segment of an entity or organization.

13. The non-transitory computer-readable medium of claim 11, further comprising instructions that, when executed by the at least one processor, cause the computer device to define the dynamic experience data content prompt for the large language model by indicating instructions to the large language model to determine the response engagement factors representing at least one of a sentiment of the text-based digital survey response, an intensity of the text-based digital survey response, or an urgency level of the text- based digital survey response.

14. The non-transitory computer-readable medium of claim 11, further comprising instructions that, when executed by the at least one processor, cause the computer device to receive from the large language model a determined category of the text-based digital survey response based on the experience data content categories.

15. The non-transitory computer-readable medium of claim 11, further comprising instructions that, when executed by the at least one processor, cause the computer device to generate the first output by:

receiving a set of recommendations based on the text-based digital survey response from the large language model; and providing the first output that comprises the set of recommendations to the administrator client device.

16. The non-transitory computer-readable medium of claim 11, further comprising instructions that, when executed by the at least one processor, cause the computer device to execute the at least one action by providing at least one of the first output or the second output to the administrator client device.

17. A system comprising:

at least one processor; and at least one non-transitory computer-readable storage medium storing instructions that, when executed by the at least one processor, cause the system to:

define a dynamic experience data content prompt for a large language model that comprises data fields for at least one of response engagement factors, experience data content categories, automated response tasks, and output formats;

receive a text-based digital survey response from a respondent device;

generate, utilizing a large language model, a first output comprising a structured data packet from the dynamic experience data content prompt and the text-based digital survey response, wherein the structured data packet comprises a header that labels a source and a payload comprises the data fields from the dynamic experience data content prompt populated with data from the text-based digital survey response;

define an additional prompt of the large language model that references the first output;

generating, utilizing the large language model with the first output and the additional prompt, a second output from the large language model; and based on the second output, executing at least one action with respect to the text- based digital survey response, wherein the at least one action comprises determining an administrator client device to which to send the first output from a set of administrator devices based on the response engagement factors and the experience data content categories.

18. The system of claim 17, further comprising instructions that, when executed by the at least one processor, cause the system to:

receive the second output from the large language model by receiving at least one of a digital gift card, a coupon or a suggested response; and route the second output to a relevant segment of an entity or organization.

19. The system of claim 17, further comprising instructions that, when executed by the at least one processor, cause the system to define the dynamic experience data content prompt for the large language model by indicating instructions to the large language model to determine the response engagement factors representing at least one of a sentiment of the text-based digital survey response, an intensity of the text-based digital survey response, or an urgency level of the text-based digital survey response.

20. The system of claim 17, further comprising instructions that, when executed by the at least one processor, cause the system to execute the at least one action by providing at least one of the first output or the second output to the administrator client device.

* * * * *